(12) United States Patent
Kang

(10) Patent No.: US 10,778,934 B2
(45) Date of Patent: Sep. 15, 2020

(54) CONVERTIBLE STAND OF DISPLAY APPARATUS

(71) Applicant: SAMSUNG ELECTRONICS CO., LTD., Suwon-si (KR)

(72) Inventor: Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/921,928

(22) Filed: Mar. 15, 2018

(65) Prior Publication Data

US 2018/0270443 A1     Sep. 20, 2018

(30) Foreign Application Priority Data

Mar. 20, 2017   (KR) .................... 10-2017-0034797

(51) Int. Cl.
*H04N 5/655*     (2006.01)
*A47B 97/00*     (2006.01)
(Continued)

(52) U.S. Cl.
CPC ............ *H04N 5/655* (2013.01); *A47B 97/001* (2013.01); *F16M 11/046* (2013.01); *F16M 11/10* (2013.01); *F16M 11/2021* (2013.01); *F16M 13/022* (2013.01); *G06F 1/1601* (2013.01); *H04N 5/63* (2013.01); *H04N 5/645* (2013.01); *F16M 2200/08* (2013.01)

(58) Field of Classification Search
CPC .......... H04N 5/655; H04N 5/645; H04N 5/63; F16M 11/2021; F16M 11/10; F16M 13/022; F16M 11/046; F16M 2200/08; F16M 11/38; F16M 11/2092; G06F 1/1601; A47B 97/001
See application file for complete search history.

(56) References Cited

U.S. PATENT DOCUMENTS 7,068,497 B2 * 6/2006 Chu ..................... F16M 11/046
                                                            248/919
7,497,410 B2 * 3/2009 Lee ...................... F16M 11/046
                                                            248/125.8
(Continued)

FOREIGN PATENT DOCUMENTS

EP       1312851 A2    5/2003
EP       2228584 A2    9/2010
(Continued)

OTHER PUBLICATIONS

Communication dated Jul. 23, 2018, from the European Patent Office in counterpart European Application No. 18159829.3.
(Continued)

*Primary Examiner* — Jefferey F Harold
*Assistant Examiner* — Humam M Satti
(74) *Attorney, Agent, or Firm* — Sughrue Mion, PLLC

(57) ABSTRACT

A convertible stand of a display apparatus is provided. In more detail, the convertible stand of the display apparatus supports a display body in a first state or a second state, the first state being a standing state and the second state being a wall-mounted state. In addition, the convertible stand of the display apparatus is coupled to a rear cover of a display body and supports the display body in the first state and the second state.

18 Claims, 16 Drawing Sheets

(51) Int. Cl.
*H04N 5/63* (2006.01)
*F16M 11/04* (2006.01)
*H04N 5/645* (2006.01)
*F16M 13/02* (2006.01)
*G06F 1/16* (2006.01)
*F16M 11/10* (2006.01)
*F16M 11/20* (2006.01)

(56) References Cited

U.S. PATENT DOCUMENTS

| | | |
|---|---|---|
| 7,789,355 B2 | 9/2010 | Gan et al. |
| 7,975,975 B2 | 7/2011 | Lee |
| 9,344,667 B2* | 5/2016 | Sculler .................... H04N 5/64 |
| 2007/0046843 A1* | 3/2007 | Maxson .................... H04N 5/64 |
| | | 348/841 |
| 2009/0008349 A1* | 1/2009 | Kim ....................... F16M 13/02 |
| | | 211/150 |
| 2009/0039212 A1* | 2/2009 | Whalen ................ A47B 81/065 |
| | | 248/158 |
| 2010/0072333 A1* | 3/2010 | Wang .................... F16M 11/16 |
| | | 248/176.3 |
| 2011/0069055 A1 | 3/2011 | Jung et al. |
| 2011/0234926 A1* | 9/2011 | Smith .................... F16M 11/10 |
| | | 348/836 |
| 2012/0305503 A1 | 12/2012 | Smith et al. |
| 2013/0256489 A1 | 10/2013 | Ergun et al. |
| 2014/0043738 A1 | 2/2014 | Hirasawa |
| 2014/0132847 A1* | 5/2014 | Okura .................... G03B 21/10 |
| | | 348/789 |
| 2014/0361131 A1* | 12/2014 | Brannan ............... A47C 21/003 |
| | | 248/176.3 |
| 2015/0353026 A1 | 12/2015 | Dayan et al. |
| 2017/0064851 A1* | 3/2017 | Shin ....................... F16M 11/22 |
| 2017/0316725 A1* | 11/2017 | Kim ........................ G06F 3/041 |

FOREIGN PATENT DOCUMENTS

| | | |
|---|---|---|
| JP | 3135891 B2 | 2/2001 |
| JP | 3131671 U | 5/2007 |
| KR | 1020050071940 A | 7/2005 |
| KR | 1020100035544 A | 4/2010 |

OTHER PUBLICATIONS

Communication dated Oct. 14, 2019, issued by the European Patent Office in counterpart European Application No. 18 159 829.3.
Communication dated Apr. 21, 2020, from the European Patent Office in counterpart European Application No. 18159829.3.

* cited by examiner

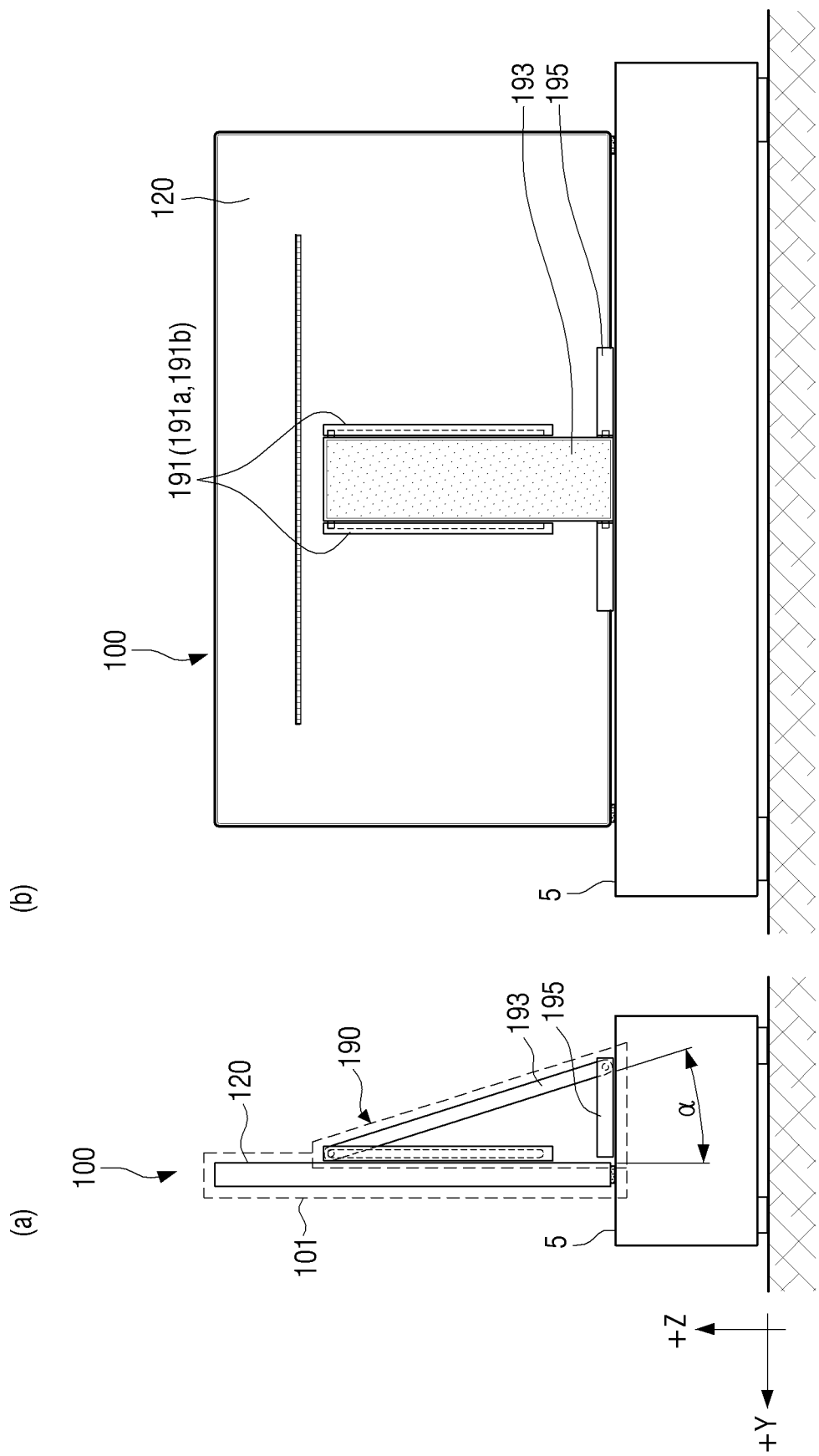

FIG. 2B
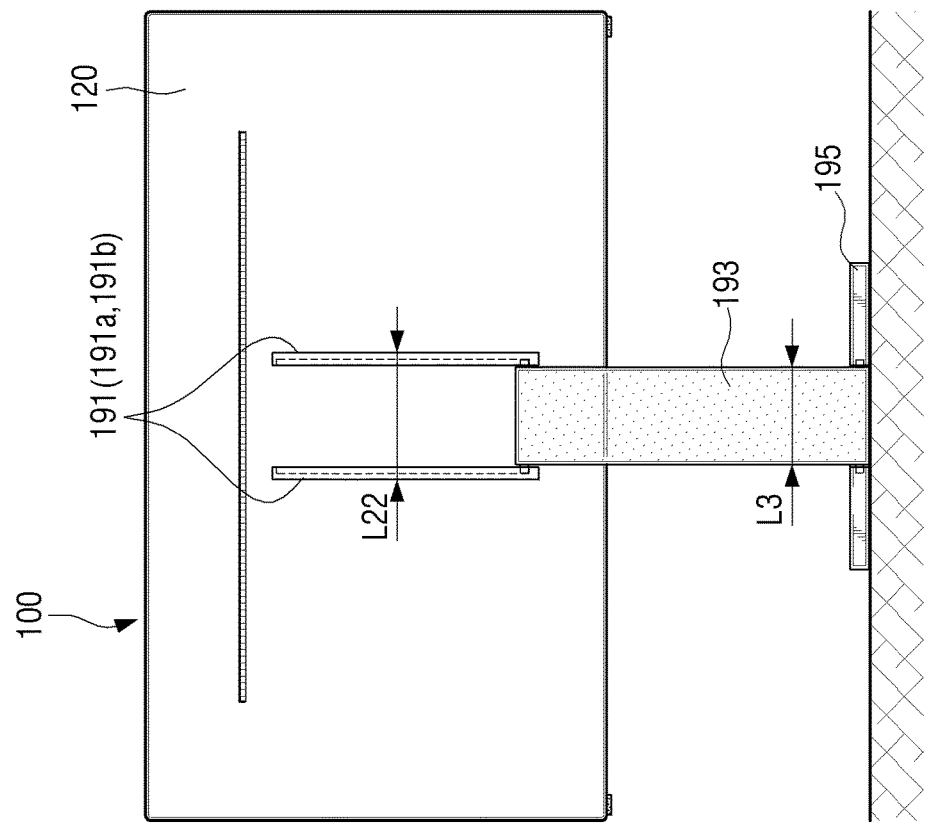
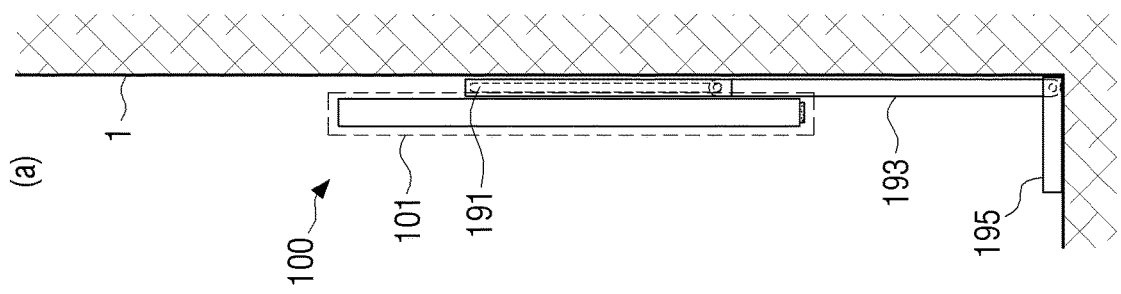

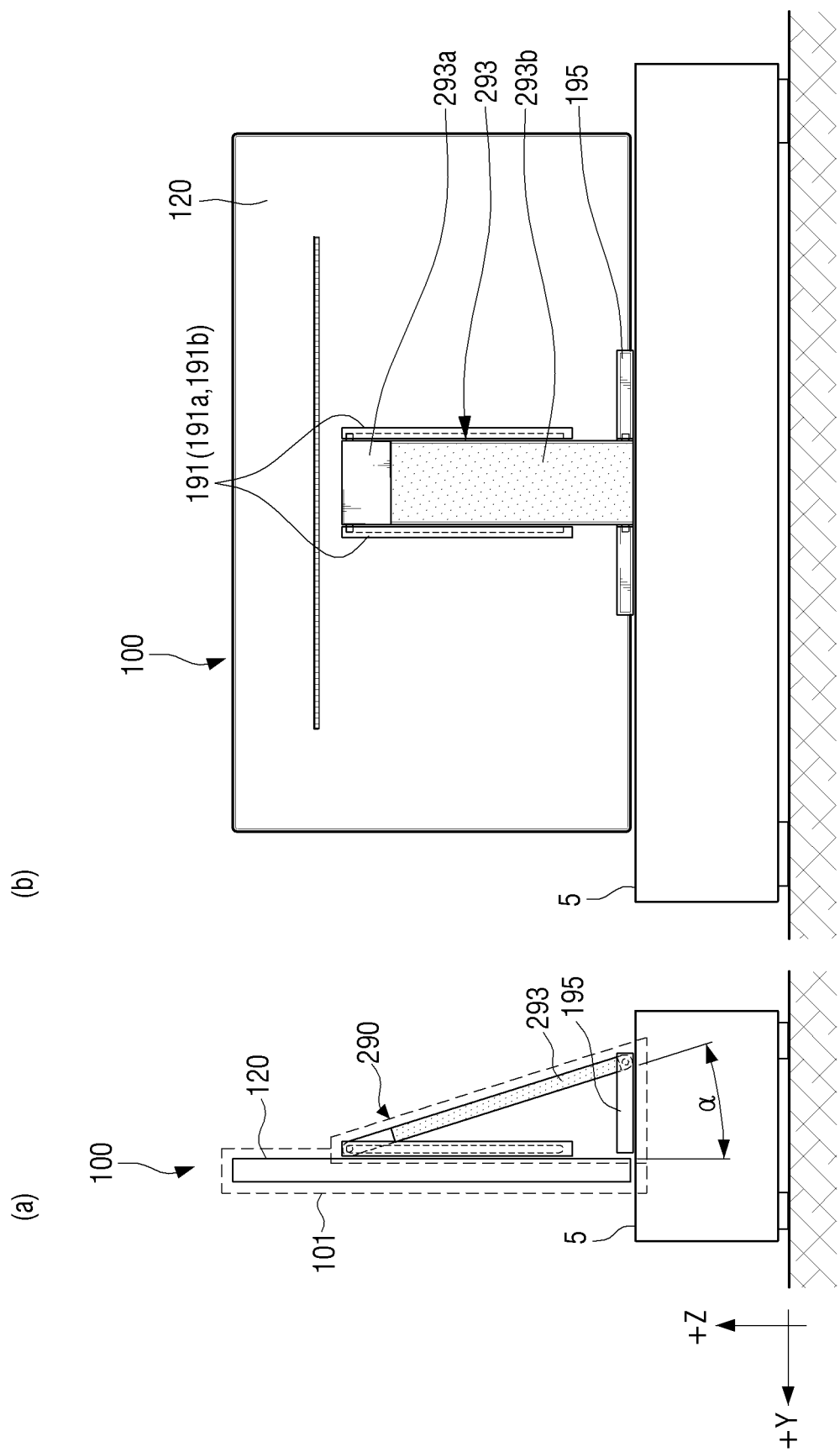

FIG. 4B
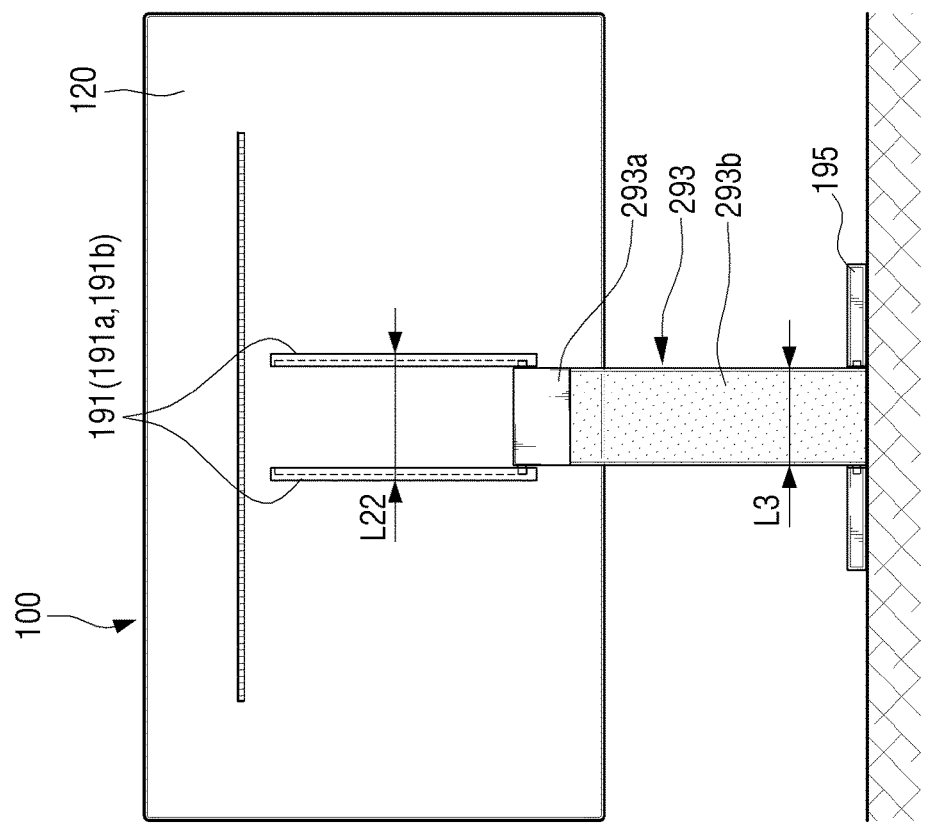
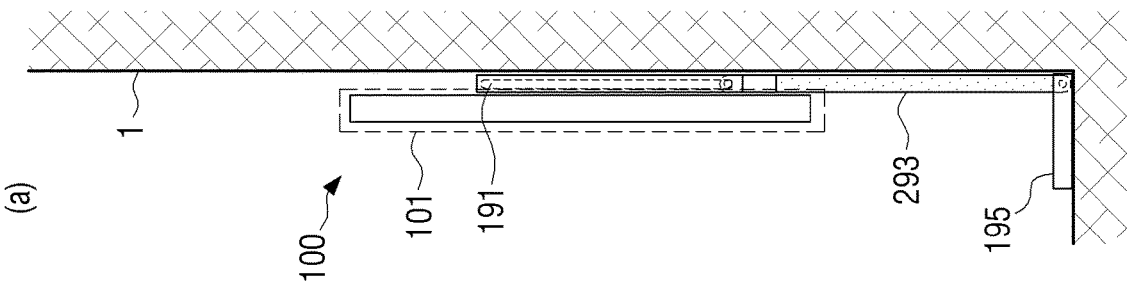

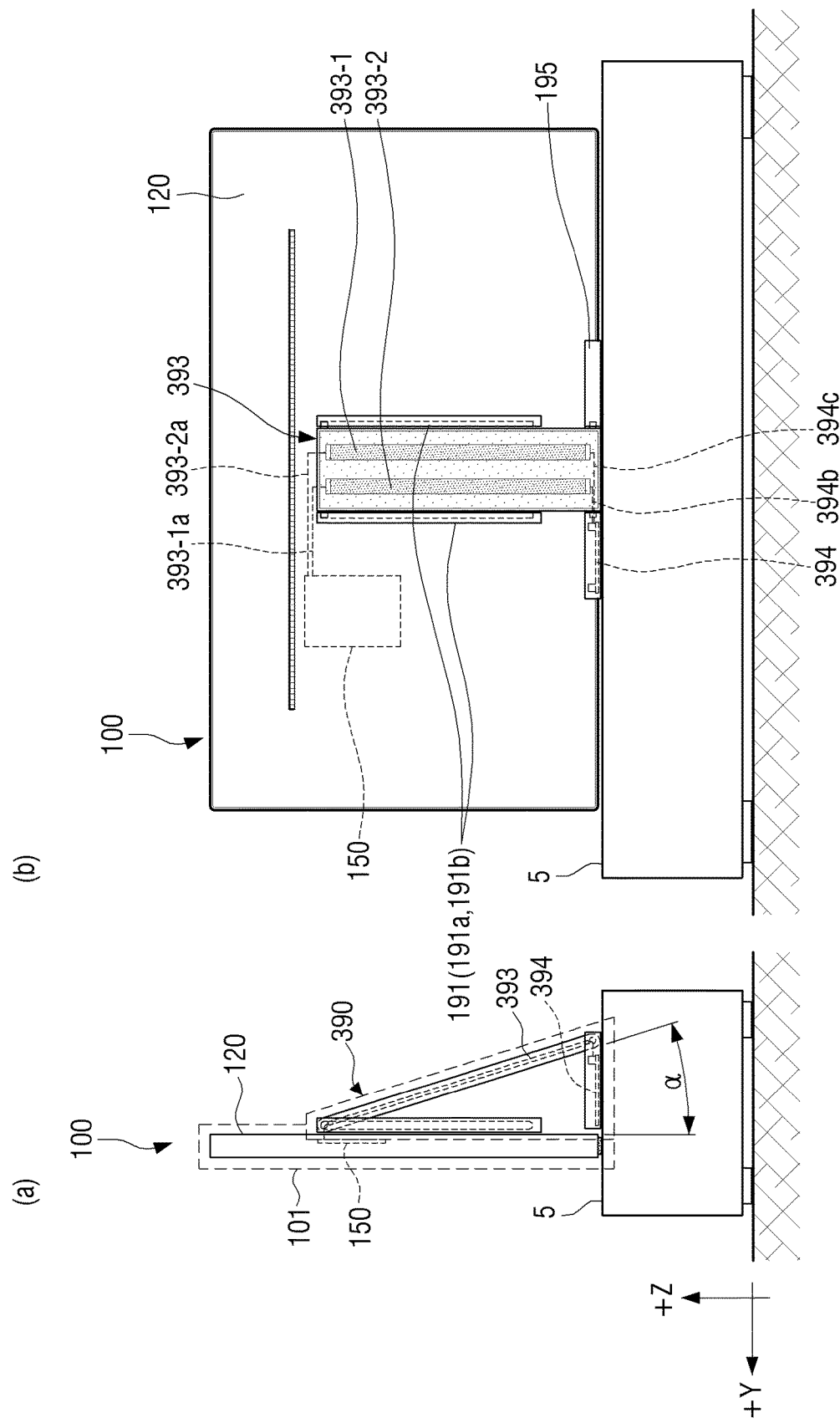

FIG. 6B
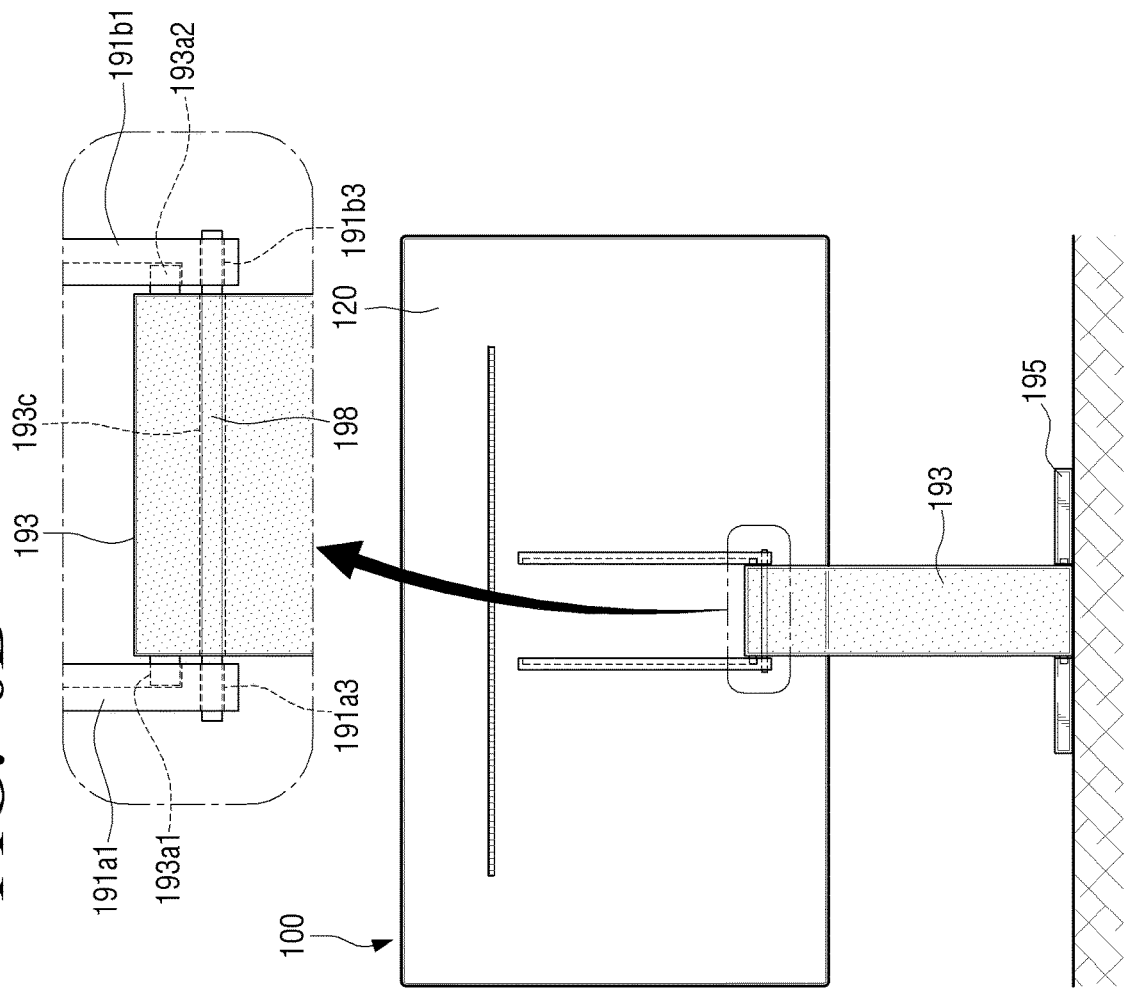
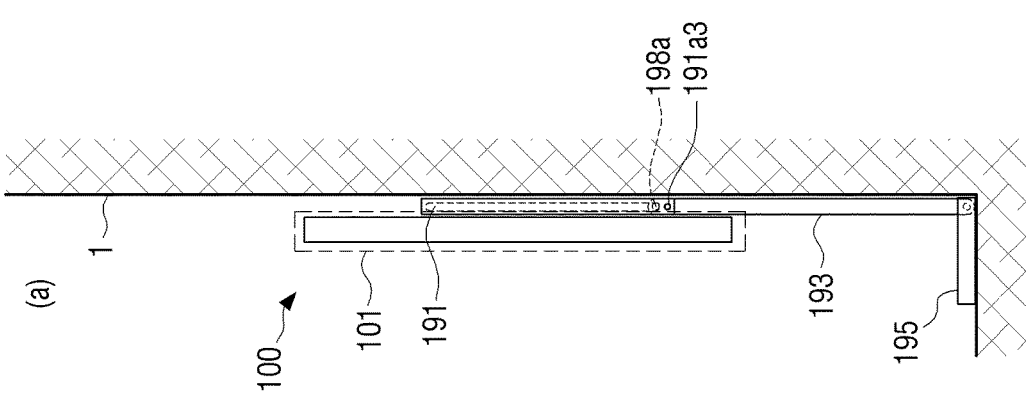

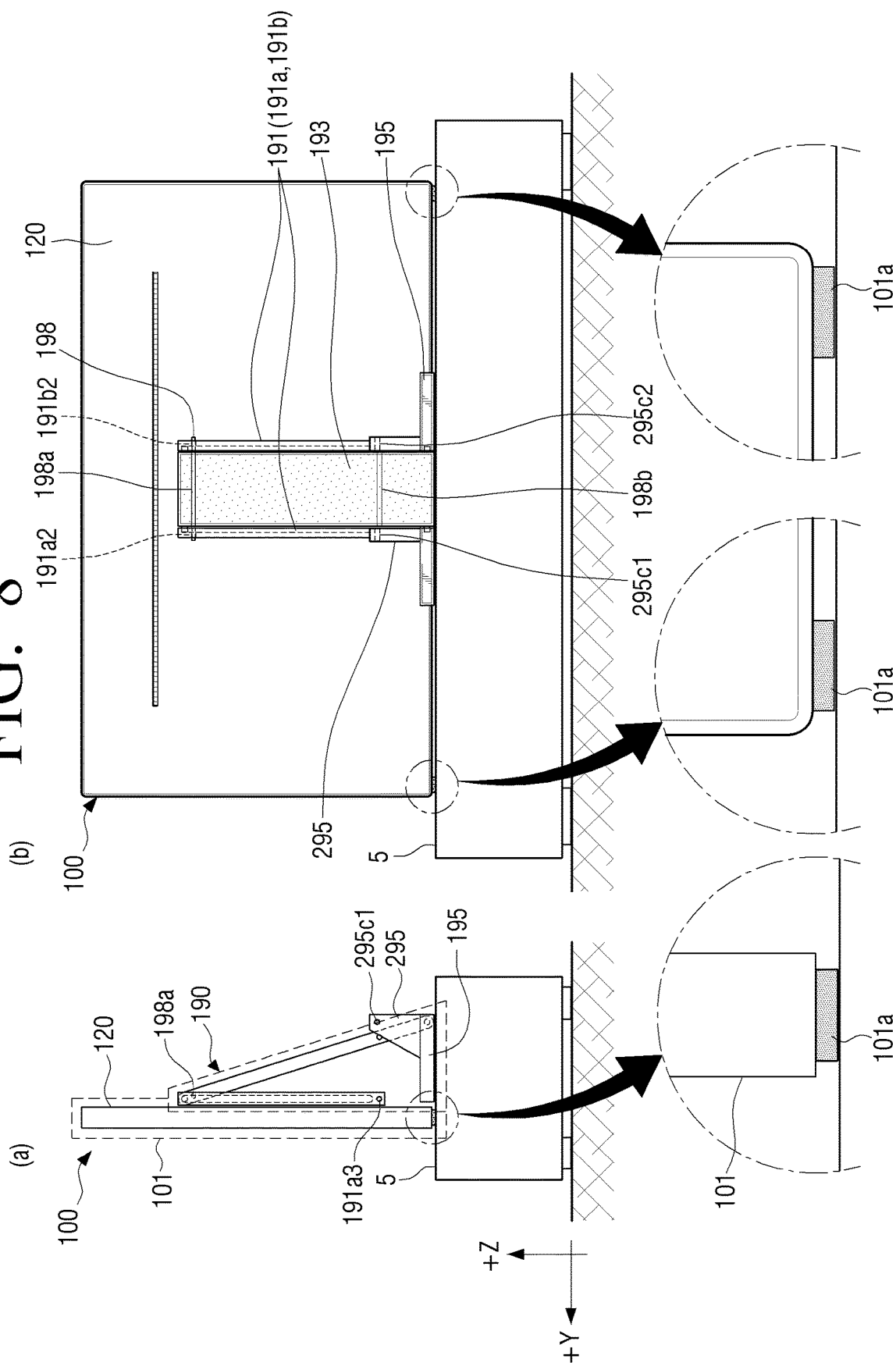

FIG. 9B
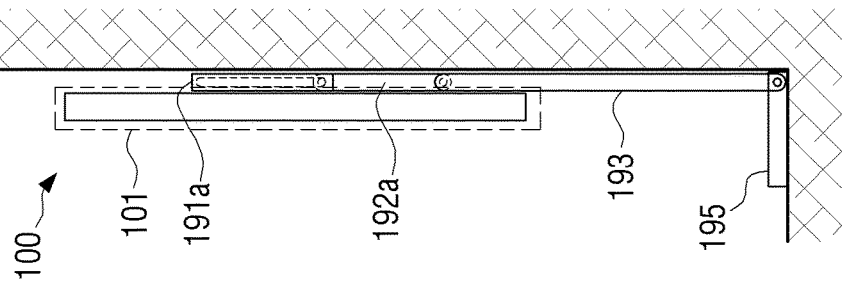
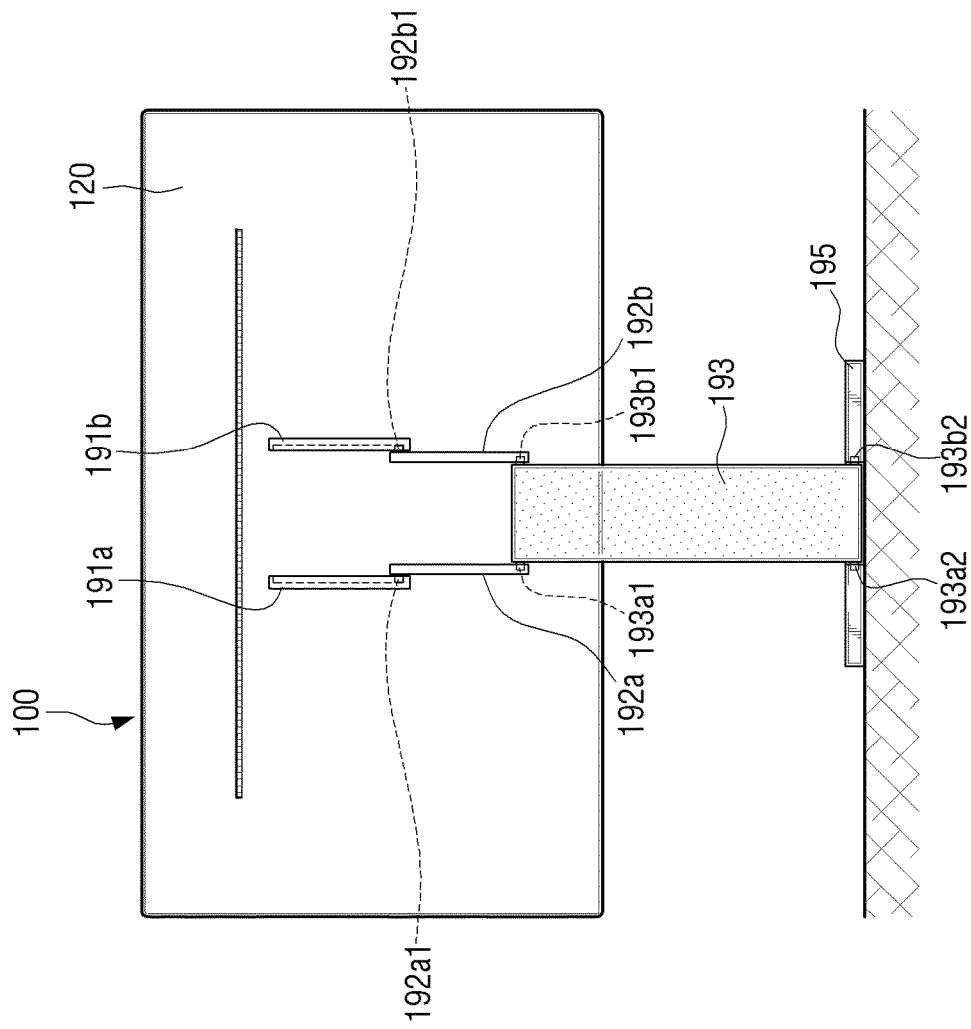

CONVERTIBLE STAND OF DISPLAY APPARATUS

CROSS-REFERENCE TO RELATED APPLICATIONS

This application is based on and claims priority from Korean Patent Application No. 10-2017-0034797, filed on Mar. 20, 2017, in the Korean Intellectual Property Office, the disclosure of which is incorporated herein by reference in its entirety.

BACKGROUND

1. Field

Apparatuses and methods consistent with the present disclosure relate to a display apparatus, and more particularly, a display apparatus including a convertible stand for supporting a display unit.

2. Description of the Related Art

Recently, a display panel of a display apparatus, for displaying content, has been provided with high resolution and has been large-sized.

Along with a large size and high resolution of a display apparatus, a thickness of a display apparatus including a display panel has been gradually slimmed. By virtue of a small thickness of a display apparatus and a narrow bezel of the display apparatus, user sense of immersion of an image is enhanced.

A display apparatus is classified into a wall-mount type display apparatus and a stand type display apparatus according to an installation method. The wall-mount (or stand) type display apparatus is capable of being fixed to a wall via wall-mount. The stand type display apparatus is positioned above a bottom surface (or a furniture surface) through a stand.

SUMMARY

Embodiments of the present disclosure overcome the above disadvantages and other disadvantages not described above. Also, the present disclosure is not required to overcome the disadvantages described above, and an embodiment of the present disclosure may not overcome any of the problems described above.

In accordance with an aspect of the disclosure, there is provided a display apparatus including: a display body; and a convertible stand coupled to a rear cover of the display body and configured to support the display body in a first state and a second state, the first state being a standing state and the second state being a wall-mounted state. A portion of the convertible stand has light transmittance higher than or equal to 80%.

The convertible stand may include: a rail bracket coupled to the rear cover; a support coupled to the rail bracket; and a base coupled to the support.

The support may include upper protrusions positioned on upper side surfaces of the support; and the rail bracket may include guide rails formed on side surfaces of the rail bracket corresponding to the upper protrusions.

The upper protrusions may be configured to perform at least one of sliding and rotation with respect to the guide rails of the rail bracket.

The rail brackets may be positioned at opposite sides with respect to the support.

The number of upper protrusions of the support may be the same as the number of the rail brackets.

The rail brackets may be fixed to at least one of video electronics standards association (VESA) holes formed in the rear cover.

The support may include lower protrusions positioned on lower side surfaces of the support; and the base may include openings formed in side surfaces of the base corresponding to the lower protrusions.

The lower protrusions may be rotatable with respect to the base.

Light transmittance of the support may be higher than or equal to 80%.

The support may be divided into a first support and a second support depending on light transmittance; and the first support in the first state may be hidden by the display body when viewed from in front of the display body.

The support may include a plurality of electrodes configured to supply power to the display body; and one of the plurality of electrodes may include ground.

Light transmittance of the support and light transmittance of the plurality of electrodes may be the same.

In the first state, the rail bracket and the support may be fixed by one pin inserted into an upper end of the rail bracket and an upper end of the support.

In the second state, the rail bracket and the support may be fixed by one pin inserted into a lower end of the rail bracket and an upper end of the support.

The convertible stand may fix different numbers of pins according to the first state and the second state; the convertible stand may be fixed by a first pin disposed through a lower end of the rail bracket and an upper end of the support in the first state; and the convertible stand may be fixed by the first pin disposed through an upper end of the rail bracket and the upper end of the support and a second pin disposed through the upper end of the support and the base in the second state.

A portion of the convertible stand may contact a wall facing the rear cover in the second state.

The display body may include at least one pads configured to contact a surface of furniture in the first state.

In accordance with another aspect of the disclosure, there is provided a display apparatus including: a display body; and a convertible stand comprising a rail bracket coupled to a rear cover of the display body, a support coupled to the rail bracket, and a base coupled to the support. Opposite ends of the support are hinged to the rail bracket and the base, respectively.

An upper end of the support may be hinged to or slides in the rail bracket.

Additional and/or other aspects and advantages of the invention will be set forth in part in the description which follows and, in part, will be obvious from the description, or may be learned by practice of the invention

BRIEF DESCRIPTION OF THE DRAWINGS

The above and other aspects, features and advantages of certain embodiments of the disclosure will be more apparent from the following description taken in conjunction with the accompanying drawings, in which:

FIGS. 1A and 1B are a schematic front view, side view, and rear view of a display apparatus in a first state according to an embodiment of the present disclosure;

FIGS. 2A and 2B are a schematic front view, side view, and rear view of a display apparatus in a second state according to an embodiment of the present disclosure;

FIGS. 4A and 4B are a schematic side view and rear view of a display apparatus in a first state and a second state according to another embodiment of the present disclosure;

FIGS. 5A and 5B are a schematic side view and rear view showing a display apparatus in a first state and a second state according to another embodiment of the present disclosure;

FIGS. 6A and 6B are a schematic side view and rear view showing a display apparatus in a first state and a second state according to another embodiment of the present disclosure;

FIG. 8 is a schematic side view and rear view showing a display apparatus in a first state according to another embodiment of the present disclosure; and FIGS. 9A and 9B are a schematic side view and rear view showing a display apparatus in a first state and a second view according to another embodiment of the present disclosure.

DETAILED DESCRIPTION

Figure 1A:
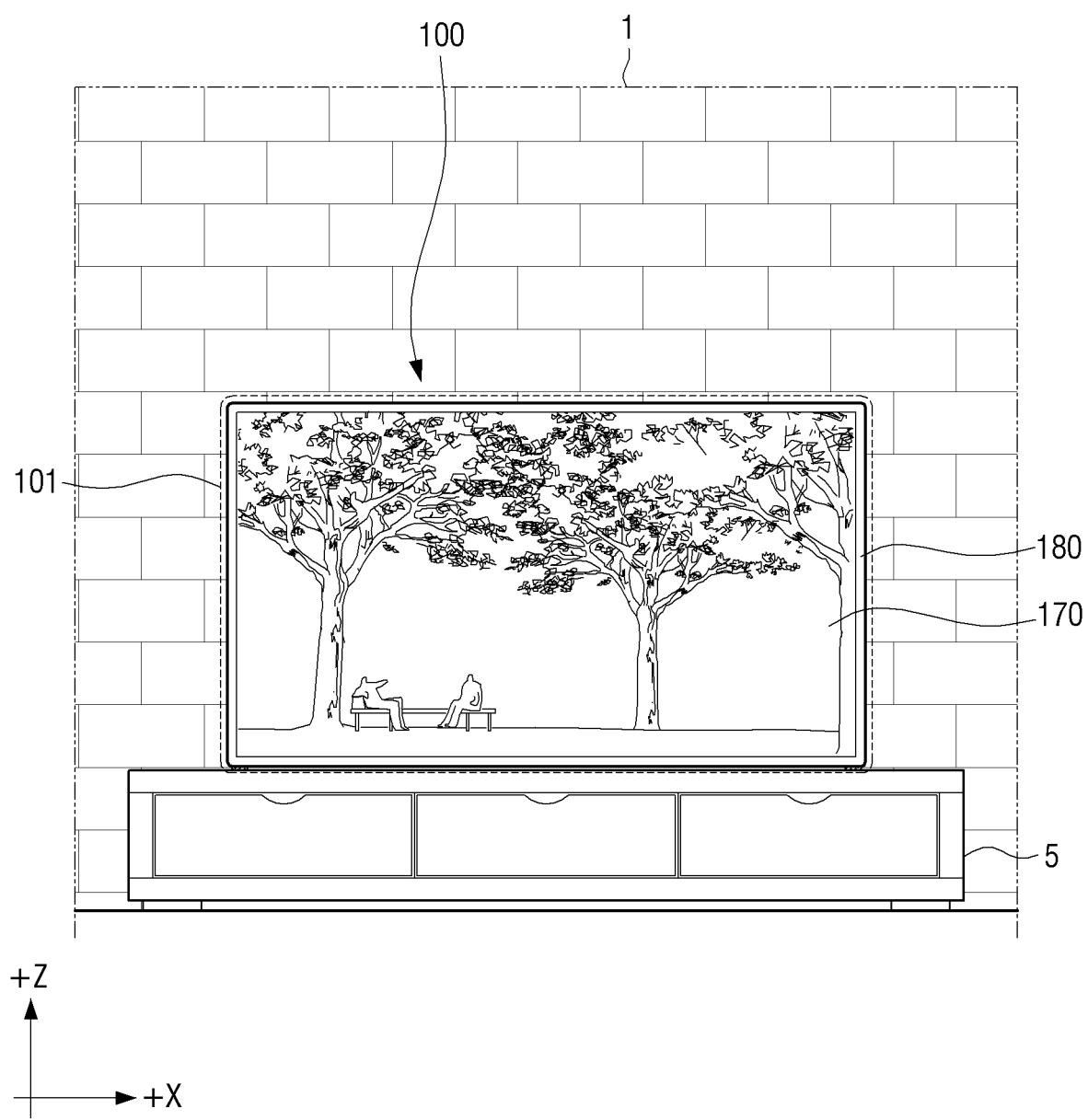

Certain embodiments of the present disclosure will now be described in greater detail with reference to the accompanying drawings. A method of manufacturing and using the present disclosure will be described in greater detail with reference to the accompanying drawings. The same reference numbers will be used throughout the drawings to refer to the same or like parts that perform substantially the same function.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element. As used herein, the term "and/or" includes any and all combinations of one or more of the associated listed items.

An application may be software that is executed in a desk-top operating system (OS), a mobile OS, or a display apparatus OS and used by a user. For example, the application may include a word processor, a spread sheet, a contacts application, a calendar application, a memo application, an alarm application, a social network system (SNS) application, a chatting application, a map application, a music player, or a video player. An application according to an embodiment of the present disclosure may refer to software that is executable in a display apparatus in response to a received user input. The application according to an embodiment of the present disclosure may refer to software that is downloaded from the outside of the display apparatus and is executable in the display apparatus.

Content may be displayed by the application executed in the display apparatus. For example, the content may include a video file or audio file reproduced by a video player as one of applications, a music file reproduced by a music player, a photo file displayed by a photo gallery, a web page file displayed by a web browser, and so on. In addition, the content may include received broadcast.

The content may include a video file, an audio file, a text file, an image file, or a web page, which is displayed or executed in an application. In addition, the content may include a video file and/or audio file included in received broadcast signal.

According to an embodiment of the present disclosure, the content may include a video file, an audio file, a text file, an image file, or a web page, which is executed to correspond to a received user input (e.g., a touch). The term 'video' may be used with the same meaning as a moving picture.

The content may include an executed application image and a user interface configuring the application image. The content may include one content or a plurality of contents.

In embodiments of the present disclosure, the expression "curvature is great" may be interpreted as being "very curved". For example, when a curve (or a curved surface) with curvature of 1000 R and a curve (or a curved surface) with curvature of 4000 R are compared with each other, the curve with curvature of 1000 R may correspond to "curvature is great". The expression that first curvature is greater than second curvature means that the first curvature is more curved than the second curvature.

According to an embodiment of the present disclosure, the display apparatus may be interpreted as including a display apparatus having a flat screen and/or a display apparatus having a curved screen.

According to an embodiment of the present disclosure, a height of a component may have the same meaning as a width. A height corresponding to an axis of coordinates of a component may have the same meaning as a width.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, components, or a combination thereof but do not preclude the presence or addition of one or more other features, integers, steps, operations, elements, components, and/or groups thereof. As used herein, the term "and/or" includes any and all combinations of one or more of the associated listed items. The same reference numbers will be used throughout the drawings to refer to the same or like parts that perform substantially the same function.

FIGS. 1A and 1B are a schematic front view, side view, and rear view of a display apparatus in a first state according to an embodiment of the present disclosure.

Referring to FIGS. 1A and 1B, a display apparatus 100 may be positioned on furniture 5 (which includes an upper flat surface). The display apparatus 100 may include a convertible stand 190 for supporting a display unit 101. A state in which the display unit 101 is supported by the convertible stand 190 corresponding to a stand type may be referred to as a first state. The display unit 101 in the first state may contact a surface of furniture (or a flat surface) or may be spaced apart from the surface of furniture (or a flat surface).

The display apparatus 100 may include a display panel 170 for displaying content, and a bottom chassis (not shown) and a top chassis 180 for supporting the display panel 170. A rear surface (e.g., −y axis direction, refer to FIG. 2B) of the display apparatus 100 may be positioned on a rear cover 120. According to an embodiment of the present disclosure, the display unit 101 may be referred to as a display body.

In FIG. 1A, when a user views the display apparatus 100 from the front of the display apparatus 100 (e.g., +y axis direction), the convertible stand 190 may be hidden by the display unit 101.

In sections (a) and (b) of FIG. 1B, the convertible stand 190 may be coupled to (or contact) the rear cover 120. The convertible stand 190 may include a rail bracket 191 fixed to the rear cover 120, a support 193 (or link) connected to the rail bracket 191 and a base 195, and the base 195. An upper end of the support 193 may be positioned at an upper end of the rail bracket 191. Opposite ends (e.g., upper and lower ends) of the support 193 as a link may be hinged to the rail bracket 191 and the base 195, respectively.

An angle α between the support 193 and the rear cover 120 in the convertible stand 190 in the first state may be changed by one of a size of the display unit 101, a length of the support 193, and positions of upper protrusions 193a1 and 193a2 (refer to FIG. 3) in guide rails 191a1 and 191b1 of the rail bracket 191. In addition, an angle α between the support 193 and the rail bracket 191 in the convertible stand 190 in the first state may be changed by one of a size of the display unit 101, a length of the support 193, and positions of the upper protrusions 193a1 and 193a2 (refer to FIG. 3) in the guide rails 191a1 and 191b1 of the rail bracket 191.

According to an embodiment of the present disclosure, the angle α between the support 193 and the rail bracket 191 in the convertible stand 190 in the first state may be appropriately changed to allow a user to view content through the display apparatus 100. For example, the angle α between the support 193 and the rail bracket 191 in the convertible stand 190 in the first state may be an acute angle. In addition, the angle α between the support 193 and the rail bracket 191 in the convertible stand 190 in the first state may be equal to or less than 180°.

When a user views the display apparatus 100 from the behind of the display apparatus 100 (e.g., −y axis direction), a region of the convertible stand 190, which corresponds to an area of the display unit 101 (e.g., a front side of the display apparatus 100), may be hidden by the display unit 101. The convertible stand 190 will be described below in detail.

The display apparatus 100 may include an analog TV, a digital TV, a 3D-TV, a smart TV, a light emitting diode (LED) TV, an organic light emitting diode (OLED) TV, a plasma TV, a quantum dot light emitting diode (QLED) TV, and/or a monitor. In addition, the display apparatus 100 may include an electronic bulletin board with a display, and/or a digital signage device.

The display apparatus 100 may be embodied as a curved display apparatus having a screen with fixed curvature, a flexible display apparatus having a screen with fixed curvature, a bended display apparatus having a screen with fixed curvature, and/or a curvature variable display apparatus in which curvature of a current screen is capable of being varied by a received user input as well as a flat display apparatus.

The display apparatus 100 according to an embodiment of the present disclosure may refer to a display apparatus at which the convertible stand 190 is capable of being installed and it would be easily understood by one of ordinary skill in the art that the present disclosure is not limited thereto.

Figure 2A:
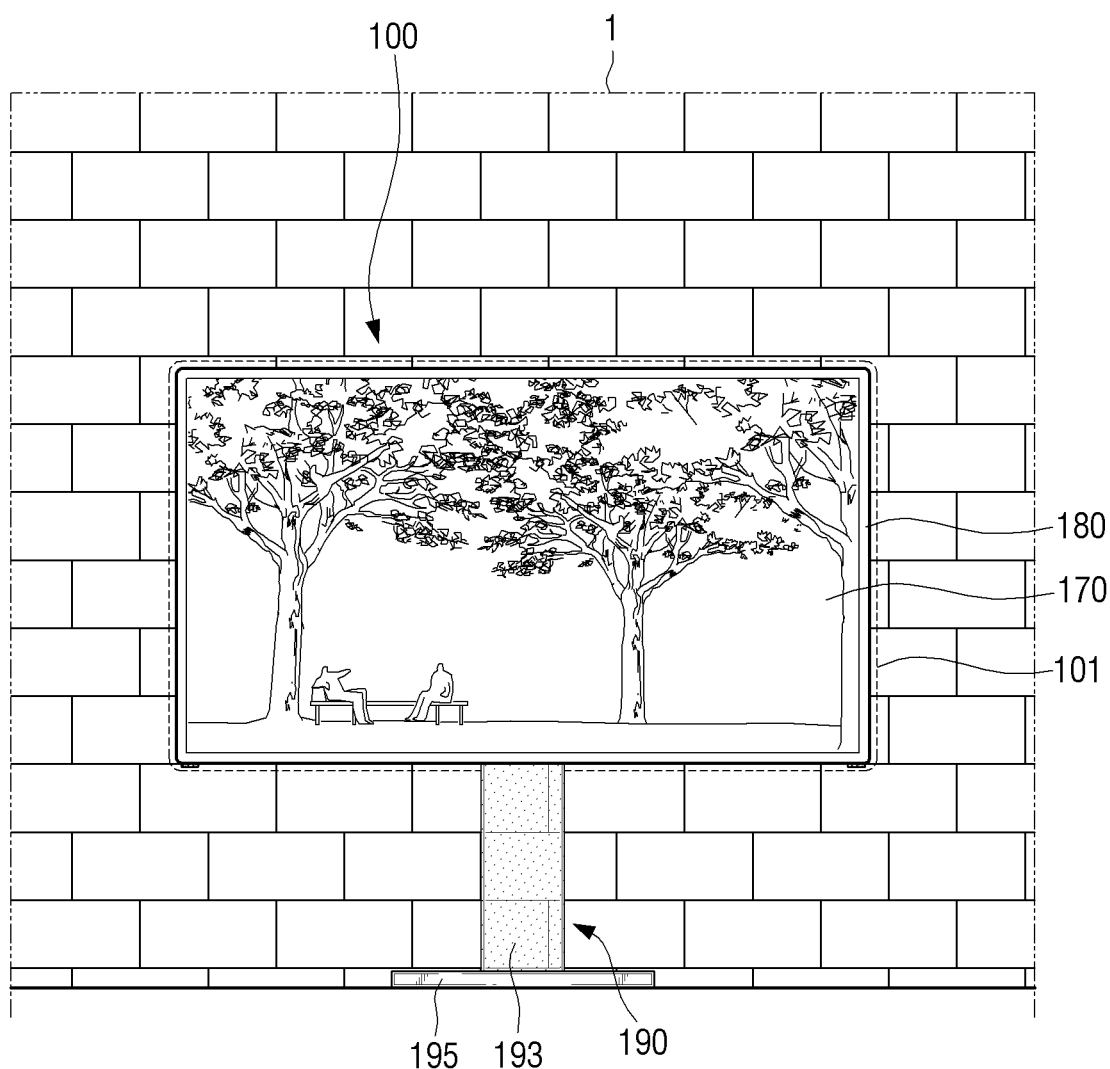

FIGS. 2A and 2B are a schematic front view, side view, and rear view of a display apparatus in a second state according to an embodiment of the present disclosure.

Referring to FIGS. 2A and 2B, the display apparatus 100 may lean against a wall 1. The display apparatus 100 may include the convertible stand 190 for supporting the display unit 101. A state in which the display unit 101 leans against the wall 1 via the convertible stand 190 corresponding to a wall-mount type may be referred to as a second state. A portion of the display unit 101 may contact the wall 1. A portion of the convertible stand 190, coupled to the display unit 101, may contact the wall 1. For example, a portion of the rail bracket 191 of the convertible stand 190, coupled to the display unit 101, may contact the wall 1. A portion of the support 193 of the convertible stand 190, coupled to the display unit 101, may contact the wall 1. In addition, the portion of the base 195 of the convertible stand 190, coupled to the display unit 101, may contact the wall 1. The convertible stand 190 may be interchangeably switched between the first state of a stand type and the second type of a wall-mount type.

In FIGS. 2A and 2B, when a user views the display apparatus 100 from the front of the display apparatus 100 (e.g., +y axis direction), a portion of the convertible stand 190 may be hidden by the display unit 101. For example, when the user views the display apparatus 100 from the front of the display apparatus 100 (e.g., +y axis direction), the base 195 of the convertible stand 190 may be exposed. A portion of the support 193 may be exposed. In addition, the rail bracket 191 may not be exposed.

The support 193 may have transparency. The support 193 may have uniform transparency (e.g., first transparency) or have other transparency (e.g., second transparency) in a partial region (e.g., one region or a plurality of regions) and uniform transparency (or first transparency) in the other region. The support 193 may have transparency higher than or equal to 80%. According to an embodiment of the present disclosure, transparency may refer to light transmittance.

In sections (a) and (b) of FIG. 2B, the convertible stand 190 may be coupled to (or contact) the rear cover 120. Differently from FIG. 1B, in the convertible stand 190, an upper end of the support 193 may be positioned at a lower end of the rail bracket 191. The convertible stand 190 will be descried in more detail.

Figure 3:
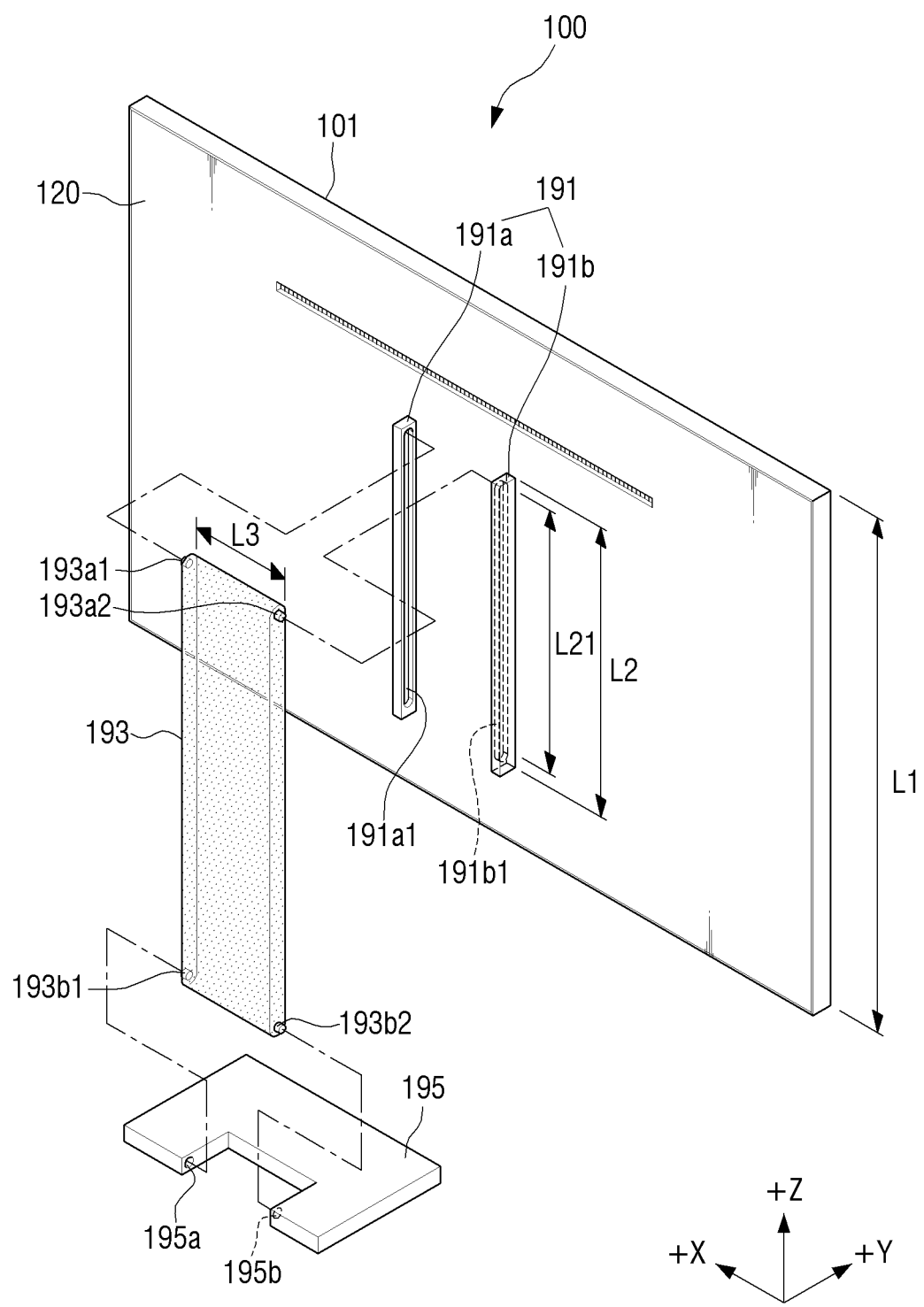
FIG. 3 is a schematic exploded perspective view of a display apparatus according to an embodiment of the present disclosure.

FIG. 3 is an exploded perspective view showing coupling between a display apparatus and a convertible stand according to an embodiment of the present disclosure.

Referring to FIG. 3, the convertible stand 190 may be coupled to the rear cover 120 of the display unit 101. The convertible stand 190 may include the rail bracket 191 fixed to the rear cover 120, the support 193 that is rotatably connected to the rail bracket 191 and the base 195, and the base 195.

The rail bracket 191 may be coupled directly to the rear cover 120 or may be coupled to the rear cover 120 through a bracket support (not shown) positioned between the rail bracket 191 and the rear cover 120.

Four or more video electronics standards association (VESA) holes (or VESA mount holes) (not shown) may be formed on a rear surface (or the rear cover 120) of the display unit 101 according to VESA standard. The standard of the VESA hole (not shown) may be width×height and may have a unit of mm. The standard of the VESA hole (not shown) may include 50×20, 75×35, 75×75, 75×50, 100×100, 100×50, 200×100, 200×50, 200×200, or 200 or greater×200 or greater. The VESA hole (not shown) may be formed on a rear surface of the display unit 101 in the form of a polygon or "T".

The rail bracket 191 may be coupled to at least one of a plurality of VESA holes (not shown) to be fixed to the display unit 101 via a coupling member (e.g., a screw and a rivet).

According to non-VESA standard, four (not shown) or more VESA holes (not shown) may be formed on the rear surface of the display unit 101. The VESA hole (not shown) according to the non-VESA standard may be formed on the rear surface of the display unit 101 in the form of a polygon or "T".

The rail bracket 191 may be coupled to at least one of VESA holes (not shown) according to the non-VESA standard to be fixed to the display unit 101 via a coupling member (e.g., a screw or a rivet).

The plurality of rail brackets 191 coupled to the rear cover 120. The rail brackets 191 may be positioned at one side 191a and the other side 191b based on the support 193, respectively.

The rail brackets 191 may have guide rails on opposite side surfaces thereof facing the support 193. A rail bracket 191a of one side may have a guide rail 191a1. A rail bracket 191b of the other side may have a guide rail 191b1. The guide rails 191a1 and 191b1 may be linearly embodied in a first direction (e.g., −z axis direction) and may have curvature (e.g., 5000 R, curvature may be changed by a manufacturer) based on a second direction (e.g., +y axis direction).

A length L21 of the guide rails 191a1 and 191b1 may be smaller than a length L2 of the rail bracket 191. For example, the length L21 of the guide rails 191a1 and 191b1 may be lower than or equal to 90% of the length L2 of the rail bracket 191. In addition, the length L21 of the guide rails 191a1 and 191b1 may be 95% or less and 35% or more of the length L2 of the rail bracket 191.

The length L2 of the rail bracket 191 may be smaller than a length L1 of the display unit 101. For example, the length L2 of the rail bracket 191 may be lower than or equal to 80% of the length L1 of the display unit 101. In addition, the length L2 of the rail bracket 191 may be 90% or less and 30% or more of the length L1 of the display unit 101.

The number of guide rails may be the same as the number of side surfaces of the support 193, on which upper protrusions are formed, respectively. For example, in FIG. 3, when the number of the guide rails 191a1 and 191b1 is two, the number of side surfaces of the support 193, on which the upper protrusions 193a1 and 193a2 are formed, respectively, may be two.

The support 193 shaped like a plate may be coupled to the rail bracket 191 and the base 195.

The upper protrusions 193a1 and 193a2 of the support 193 may face the guide rails 191a1 and 191b1 of the rail bracket 191. The upper protrusions 193a1 and 193a2 of the support 193 may slide (or move) along the guide rails 191a1 and 191b1. The upper protrusions 193a1 and 193a2 may have any shape as long as the upper protrusions 193a1 and 193a2 are capable of moving along the guide rails 191a1 and 191b1. The upper protrusions 193a1 and 193a2 of the support 193 may be rotatable based on the guide rails 191a1 and 191b1. The upper protrusions 193a1 and 193a2 may have any shape as long as the upper protrusions 193a1 and 193a2 are capable of being rotated with respect to the guide rails 191a1 and 191b1.

The upper protrusions 193a1 and 193a2 of the support 193 may have a thickness (or a diameter) which may be smaller than a thickness of the rail bracket 191. A thickness of the upper protrusions 193a1 and 193a2 may be equal to or less than a width of the guide rails 191a1 and 191b1.

Lower protrusions 193b1 and 193b2 of the support 193 may face openings 195a and 195b of the base 195. The lower protrusions 193b1 and 193b2 of the support 193 may be rotated with respect to the openings 195a and 195b coupled thereto. The lower protrusions 193b1 and 193b2 may have any shape as long as the lower protrusions 193b1 and 193b2 are rotatable based on the openings 195a and 195b.

The lower protrusions 193b1 and 193b2 of the support 193 may have a thickness (or a diameter) which may be smaller than a thickness of the base 195. A thickness of the lower protrusions 193b1 and 193b2 may be equal to or less than a width of the openings 195a and 195b.

The support 193 may have transparency. The support 193 may have light transmittance higher than or equal to 80%. The support 193 may have light transmittance of higher than or equal to 50% or lower than or equal to 99%.

The support 193 may include an insulator material, a flame retardant or non-combustible material.

A width L3 of the support 193 may be smaller than an interval L22 (refer to FIG. 2B) between external side surfaces (e.g., surfaces on which the guide rails 191a1 and 191b1 are not formed) of rail brackets 191a and 191b.

The base 195 (or a stand base) may be coupled to the support 193. The openings 195a and 195b of the base 195 may be coupled to the lower protrusions 193b1 and 193b2 of the support 193. The lower protrusions 193b1 and 193b2 of the support 193 may be capable of being rotated with respect to the openings 195a and 195b of the base 195.

A shape of the base 195 may include a polygonal column, an elliptic cylinder, a cylinder, or a freeform column.

Transparency (or light transmittance) of the base 195 may be lower than or equal to 50%. Transparency of the base 195 may be lower than or equal to 90% and higher than or equal to 30%. Transparency of the base 195 may be the same or different from transparency of the support 193.

According to another embodiment of the present disclosure, a rail bracket (not shown) may be one. One rail bracket may be coupled to the rear cover 120. Guide rails (not shown) may be formed on opposite side surfaces of a rail bracket. The guide rails formed on the opposite side surfaces of a rail bracket may face an upper protrusion (not shown) that protrudes in a horse-hoof form (e.g., U) to extend from one end (e.g., an upper end) of a bar type support (not shown).

Opposite ends (e.g., upper and lower ends) of the support 193 as a link may be hinged to the rail bracket 191 and the base 195, respectively. Opposite protrusions (upper and lower protrusions) of the support 193 as a link may be hinged to the rail bracket 191 and the base 195, respectively. The upper protrusions 193a1 and 193a2 of the support 193 as a link may be hinged to and may slide in the guide rails 191a1 and 191b1 of the rail bracket 191.

FIGS. 4A and 4B are a schematic side view and rear view of a display apparatus in a first state and a second state according to another embodiment of the present disclosure.

Referring to FIGS. 4A and 4B, display apparatus 100 may include a convertible stand 290 for supporting the display unit 101 in one of a first state and a second state. The convertible stand 290 may be embodied in a first state in which the display unit 101 is supported by the convertible stand 290 corresponding to a stand type and a second state in which the display unit 101 leans against a wall via the convertible stand 290 corresponding to a wall-mount type.

The convertible stand 290 of FIGS. 4A and 4B is substantially similar (e.g., a difference in a support) to the convertible stand 190 of FIGS. 1B and 2B and, thus, a repeated description thereof will be omitted herein.

A support 293 of the convertible stand 290 of FIGS. 4A and 4B may be similar to a function and operation of the support 193 of the convertible stand 190 of FIGS. 1B and 2B. In FIGS. 4A and 4B, the support 293 of the convertible stand 290 may have a plurality of transparencies. For example, the support 293 may be embodied as a first support 293a connected to the rail bracket 191 and a second support 293b connected to the first support 293a.

The first support 293a may include protrusions (not shown) corresponding to the upper protrusions 193a1 and 193a2 of the support 193 in FIG. 3. The protrusions (not shown) of the first support 293a may substantially similar to the upper protrusions 193a1 and 193a2 of the support 193 in FIGS. 1A to 3 and, thus, a repeated description thereof will be omitted herein.

The first support 293a may have $11^{th}$ transparency. The $11^{th}$ transparency of the first support 293a may be lower than or equal to 70%. In addition, the $11^{th}$ transparency of the first support 293a may be higher than or equal to 20% or lower than or equal to 70%.

The second support 293b may be coupled to the below (a first direction (e.g., −z axis direction)) of the first support 293a. The second support 293b and the first support 293a may be coupled via a coupling member (e.g., a screw and a rivet).

The second support 293b may include protrusions (not shown) corresponding to the lower protrusions 193b1 and 193b2 of the support 193 in FIG. 3. The protrusions (not shown) of the second support 293b are substantially the same as the lower protrusions 193b1 and 193b2 of the support 193 in FIGS. 1A to 3 and, thus, a repeated description thereof will be omitted herein.

The second support 293b may have $12^{th}$ transparency. The $12^{th}$ transparency of the second support 293b may be higher than or equal to 80%. The $12^{th}$ transparency of the second support 293b may be higher than or equal to 50% or lower than or equal to 99%.

A surface area of the first support 293a in the support 293 (or a length in a first direction (e.g., −z axis direction) of the first support 293a) may be smaller than a surface area of the second support 293b (or a length in a first direction (e.g., −z axis direction) of the second support 293b). A surface area of the first support 293a in the support 293 may be lower than or equal to 30% of a surface area of the second support 293b.

In FIG. 4B, when a user views the display apparatus 100 from the front of the display apparatus 100 (e.g., +y axis direction), a portion of the support 293 may be hidden by the display unit 101. When the user views the display apparatus 100 from the front of the display apparatus 100 (e.g., +y axis direction), the first support 293a may be hidden by the display unit 101. When the user views the display apparatus 100 from the front of the display apparatus 100 (e.g., +y axis direction), a size (e.g., a horizontal length×a vertical length) of the first support 293a may be any size as long as the first support 293a is hidden by the display unit 101.

When the user views the display apparatus 100 from the front of the display apparatus 100 (e.g., +y axis direction), a portion of the second support 293b may be hidden by the display unit 101.

According to another embodiment of the present disclosure, the support 293 may include a protrusion (not shown) and may be embodied as the first support 293a connected to the rail bracket 191, the second support 293b connected to the first support 293a, and a third support (not shown) connected to the second support 293b and connected to the base 195. A protrusion (not shown) of the third support (not shown) may be rotatably connected to the openings 195a and 195b of the base 195.

The first support 293a may have $11^{th}$ transparency, the second support 293b may have $12^{th}$ transparency, and the third support (not shown) may have $13^{th}$ transparency. At least one of the $11^{th}$ transparency, the $12^{th}$ transparency, and the $13^{th}$ transparency may be different or the same.

Figure 5B:
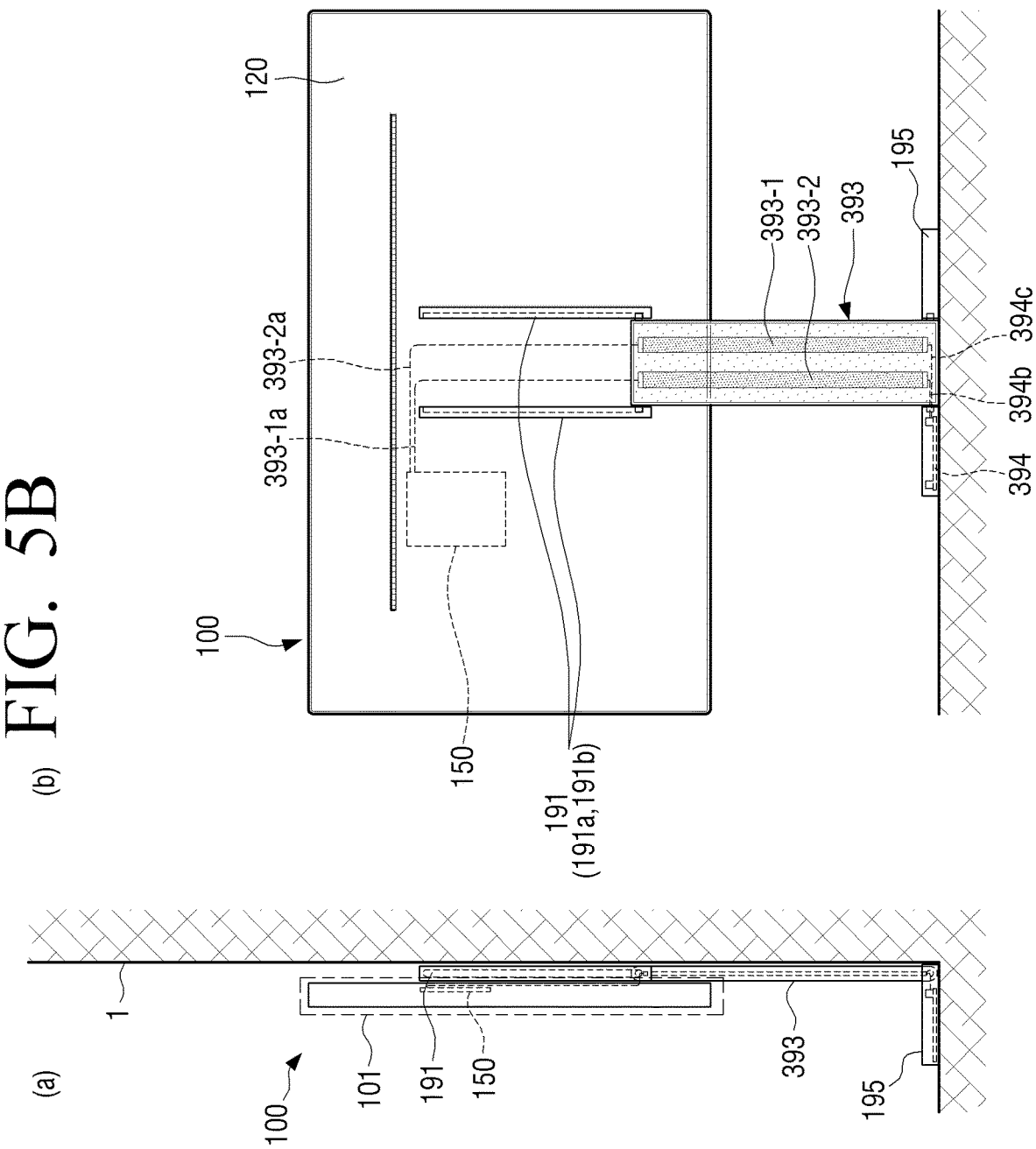

FIGS. 5A and 5B are a schematic side view and rear view showing a display apparatus in a first state and a second state according to another embodiment of the present disclosure.

Referring to FIGS. 5A and 5B, the display apparatus 100 may include a convertible stand 390 for supporting the display unit 101 in one of a first state and a second state. In FIGS. 5A and 5B, a state of the convertible stand 390 may be substantially the same as a state (e.g., a first state and a second state) of the convertible stand 290 in FIGS. 4A and 4B and, thus, a repeated description will be omitted herein.

In FIGS. 5A and 5B, a support 393 of the convertible stand 390 may be different from one of a function and operation of the support 193 of the convertible stand 190 of FIGS. 1B and 2B. In addition, the support 393 of the convertible stand 390 of FIGS. 5A and 5B may be different from one of a function and operation of the support 293 of the convertible stand 290 of FIGS. 4A and 4B.

In FIGS. 5A and 5B, the support 393 of the convertible stand 390 may include one or a plurality of electrodes. A plurality of electrodes 393-1 and 393-2 may transmit power transmitted through a power cord (not shown) transmitted to power supply unit 150 of the display apparatus 100. The plurality of electrodes 393-1 and 393-2 may receive power through a circuit board 394 and an internal electric wire (or internal cables 394b and 394c) inside the base 195 connected to a power cord (not shown). The plurality of electrodes 393-1 and 393-2 may transmit the received power to the power supply unit 150 of the display apparatus 100 through the internal electric wire (or internal cables 393-1a and 393-2a).

The electrodes 393-1 and 393-2 may be embodied as a film type thin film. The electrodes 393-1 and 393-2 as a thin film may be a current wire and ground.

The electrodes 393-1 and 393-2 may be embodied via deposition or vacuum evaporation, adhesion, or coating on the support 393. In addition, the electrodes 393-1 and 393-2 may be embodied using a method of indium tin oxide (ITO), silver nanowire, fluorine tin oxide (FTO), metal mesh, or the like on the support 393.

Conductivity of the electrodes 393-1 and 393-2 may be lower than conductivity of copper. A width of the electrodes 393-1 and 393-2 (e.g., 10 mm or more to 100 mm or less) may be significantly greater than a thickness (e.g., 3 mm or less to 3 μm or more) of the electrodes 393-1 and 393-2 due to low conductivity (e.g., width>>thickness). A width of the electrodes 393-1 and 393-2 may be smaller than a width of the support 393 (e.g., lower than or equal to 49% of the width of the support 393)

The electrodes 393-1 and 393-2 may be positioned between additional supports (not shown) coupled to the support 393 in front of the support 393 (e.g., +y axis direction).

A film (not shown) or coating (not shown) as well as the additional support (not shown) may be positioned in front of the electrodes 393-1 and 393-2 (e.g., +y axis direction) above the support 393.

A material of at least one of the support 393 and the additional support (not shown), a material of a film (not shown), and a material of coating (not shown) may be an insulator material differently from a conductive material of the electrodes 393-1 and 393-2. In addition, the support 393 and the additional support (not shown) may be formed of a flame retardant material or a non-combustible material.

The support 393 of the convertible stand 390 may have $21^{st}$ transparency. The electrodes 393-1 and 393-2 may have $22a^{th}$ transparency (which corresponds to the electrode 393-1) and $22b^{th}$ transparency (which corresponds to the electrode 393-2). $21^{st}$ transparency of the support 393 may be the same as or different from $22^{nd}$ transparency of an electrode. The $21^{st}$ transparency of the support 393 may be the same as or different from $22a^{th}$ transparency of the electrode 393-1 and $22b^{th}$ transparency of the electrode 393-2.

The electrodes 393-1 and 393-2 may have $22a^{th}$ transparency (which corresponds to the electrode 393-1) and $22b^{th}$ transparency (which corresponds to the electrode 393-2) according to the number of electrodes. The $22a^{th}$ transparency may be the same as or different from the $22b^{th}$ transparency.

Figure 6A:
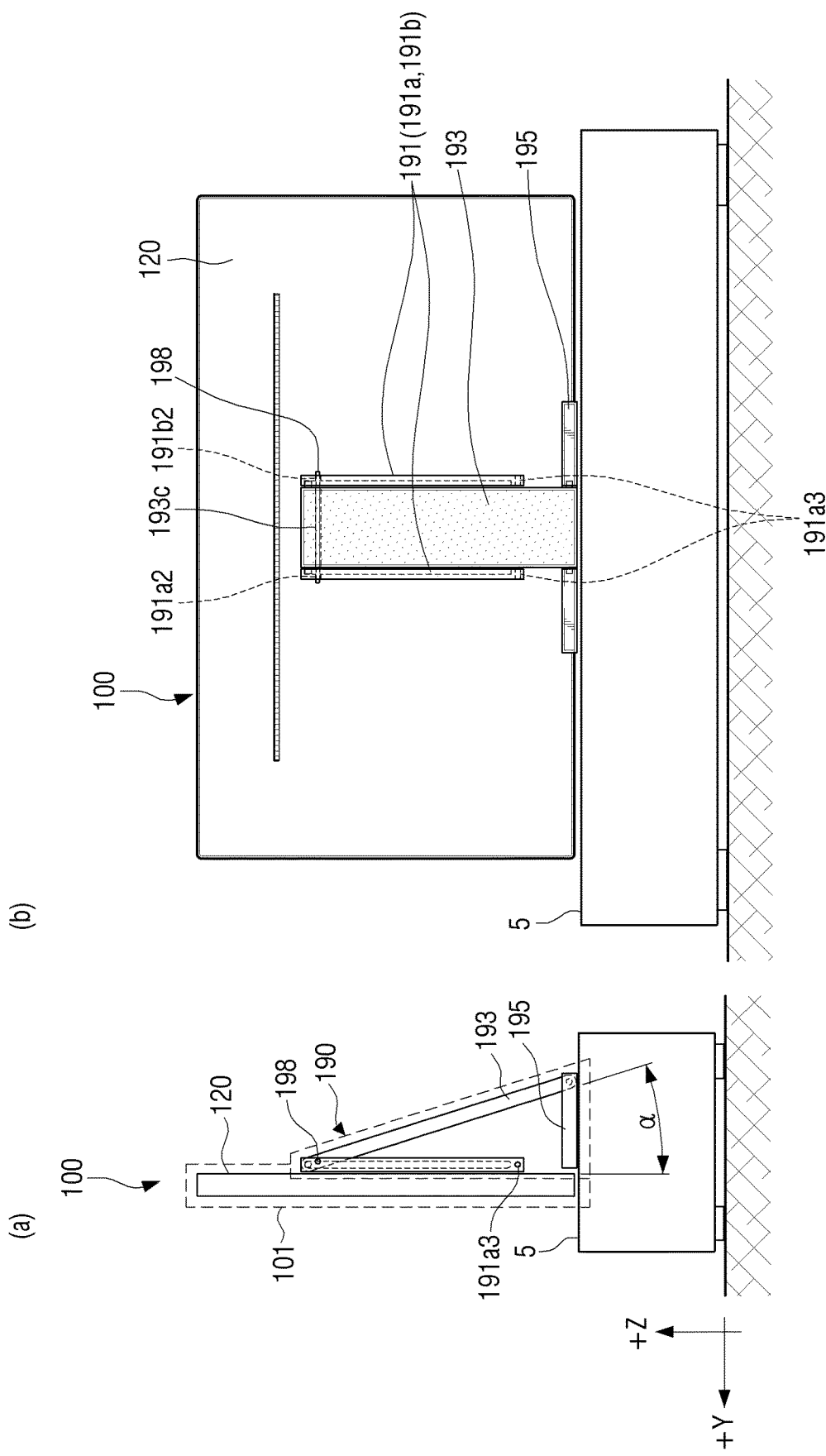

FIGS. 6A and 6B are a schematic side view and rear view showing a display apparatus in a first state and a second state according to another embodiment of the present disclosure.

Referring to FIGS. 6A and 6B, the display apparatus 100 may include the convertible stand 190 for supporting the display unit 101 in one of a first state and a second state. A state (e.g., a first state and a second state) of the convertible stand 190 of FIGS. 6A and 6B may be substantially similar to a state of the convertible stand 190 of FIGS. 1B and 2B and, thus, a repeated description thereof will be omitted therein.

The convertible stand 190 of FIGS. 6A and 6B may be substantially similar (e.g., a difference of a pin 198) to the convertible stand 190 of FIGS. 1B and 2B and, thus, a repeated description thereof will be omitted therein. The pin 198 may fix the support 193 to the rail brackets 191a and 191b. The pin 198 may fix rotation and sliding (or moving) of the support 193 with respect to the rail brackets 191a and 191b. The pin 198 may include a fixing pin.

The convertible stand 190 except for the pin 198 in FIGS. 6A and 6B may be similar to a function and operation of the convertible stand 190 of FIGS. 1B and 2B.

In FIG. 6A, a hole 193c corresponding to the pin 198 may be formed at an upper end of the support 193. Holes 191a2 and 191b2 corresponding to the pin 198 may be formed in the rail brackets 191a and 191b of the convertible stand 190 in a first state, respectively. The holes 191a2 and 191b2 corresponding to the pin 198 may be formed at an upper end of the rail brackets 191a and 191b (e.g., one end in an opposite direction to a first direction (−z axis direction) with respect to a center of an entire length of a rail bracket) corresponding to a first state.

The holes 191a2 and 191b2 may be formed in the rail brackets 191a and 191b to be adjacent (e.g., 4 cm or less) to the upper protrusions 193a1 and 193a2 of the support 193, respectively. In the first state, the pin 198 may be inserted into the hole 193c of the support 193 and the holes 191a2 and 191b2 of the rail brackets 191a and 191b. In the first state, the pin 198 may be inserted into only one of the hole 191a2 and the hole 191b2 according to an insertion direction of a pin.

An additional hole (e.g., one or two or more additional holes) may be formed at an upper end of the rail brackets 191a and 191b in the first state to be adjacent (e.g., 4 cm or less) to the holes 191a2 and 191b2 corresponding to the pin 198. In addition, an additional hole (e.g., one or two or more additional holes) corresponding to an angle α between the support 193 and the rail brackets 191a and 191b may be formed at the upper end of the rail brackets 191a and 191b in the first state to be adjacent (e.g., 4 cm or less) to the holes 191a2 and 191b2 corresponding to the pin 198.

In FIG. 6B, holes 191a3 and 191b3 corresponding to the pin 198 may be formed at a lower end (e.g., the other end in a first direction (−z axis direction) with respect to a center of an entire length of a rail bracket) of the rail brackets 191a and 191b of the convertible stand 190 corresponding to a second state.

The holes 191a3 and 191b3 may be formed in the rail brackets 191a and 191b to be adjacent (e.g., 4 cm or less) to the lower protrusions 193b1 and 193b2 of the support 193, respectively. In the second state, the pin 198 may be inserted into the hole 193c of the support 193 and the holes 191a3 and 191b3 of the rail brackets 191a and 191b. In the second state, the pin 198 may be inserted into only one of the hole 191a3 and the hole 191b3 according to an insertion direction of a pin.

An additional hole (e.g., one or two or more additional holes) may be formed at a lower end of the rail brackets 191a and 191b in the second state to be adjacent (e.g., 4 cm or less) to the holes 191a3 and 191b3 corresponding to the pin 198. An additional hole (e.g., one or two or more additional holes) corresponding to an angle α between the support 193 and the rail brackets 191a and 191b may be formed at the lower end of the rail brackets 191a and 191b in the second state to be adjacent (e.g., 4 cm or less) to the holes 191a3 and 191b3 corresponding to the pin 198.

In the second state, the pin 198 may be inserted into the hole 193c of the support 193 and the holes 191a3 and 191b3 of the rail brackets 191a and 191b. In the first state, the pin 198 may be inserted into only of the hole 191a2 and the hole 191b2 according to an insertion direction of a pin.

The number of holes formed in the support 193 may be one or plural. The holes 191a2 and 191b2 and the hole 193c of the support 193 may be formed in the rail brackets 191a and 191b to be adjacent (e.g., 4 cm or less) to the upper protrusions 193a1 and 193a2 of the support 193.

The number of holes of the support 193 may be smaller than the number of holes of the rail bracket 191. The number of holes of the support 193 may be the same or less than the number of holes of the rail bracket 191a. The number of holes of the support 193 may be the same or less than the number of holes of the rail bracket 191b.

Figure 7A:
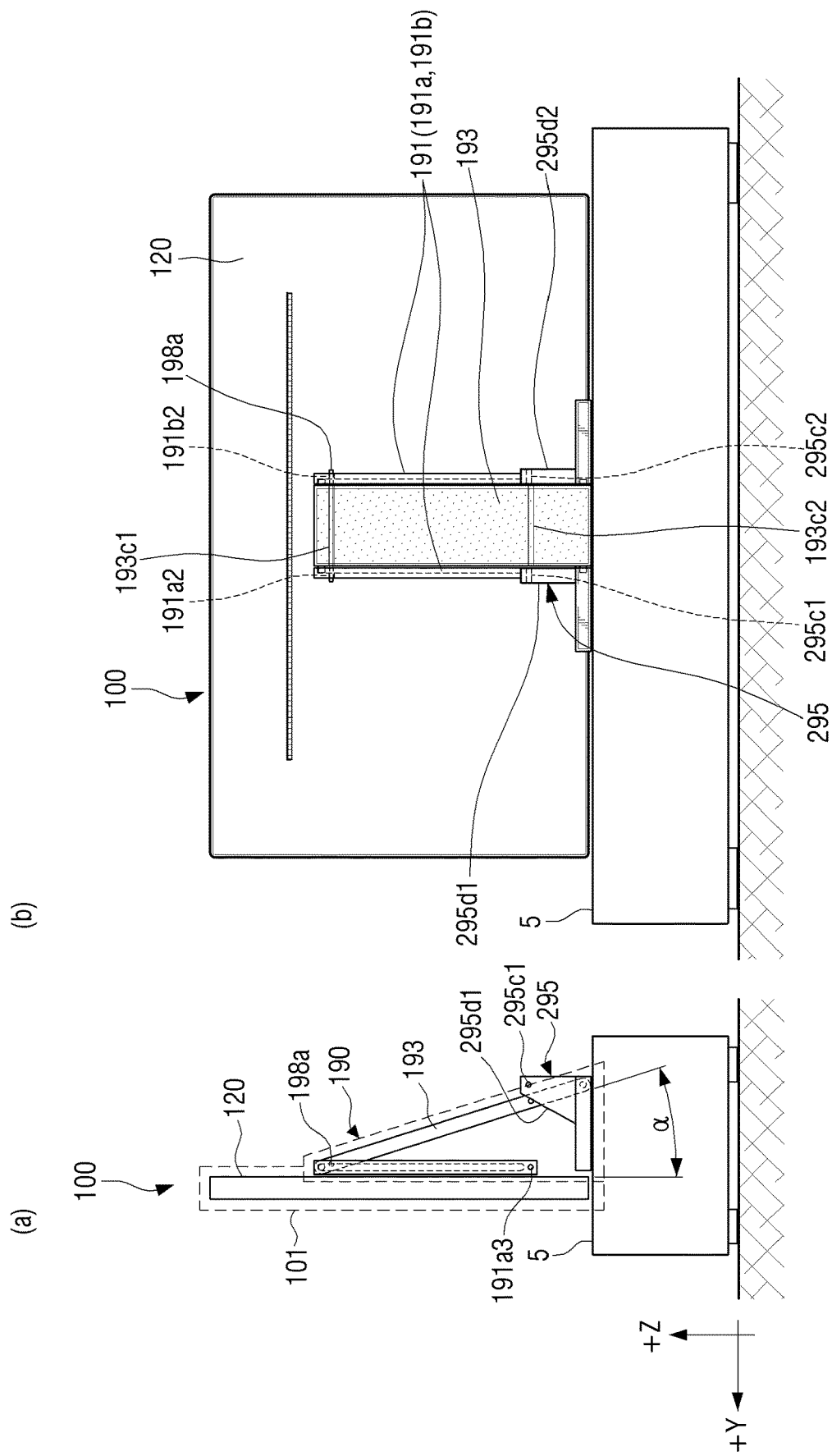
FIGS. 7A and 7B are a schematic side view and rear view showing a display apparatus in a first state and a second state according to another embodiment of the present disclosure.
Figure 7B:
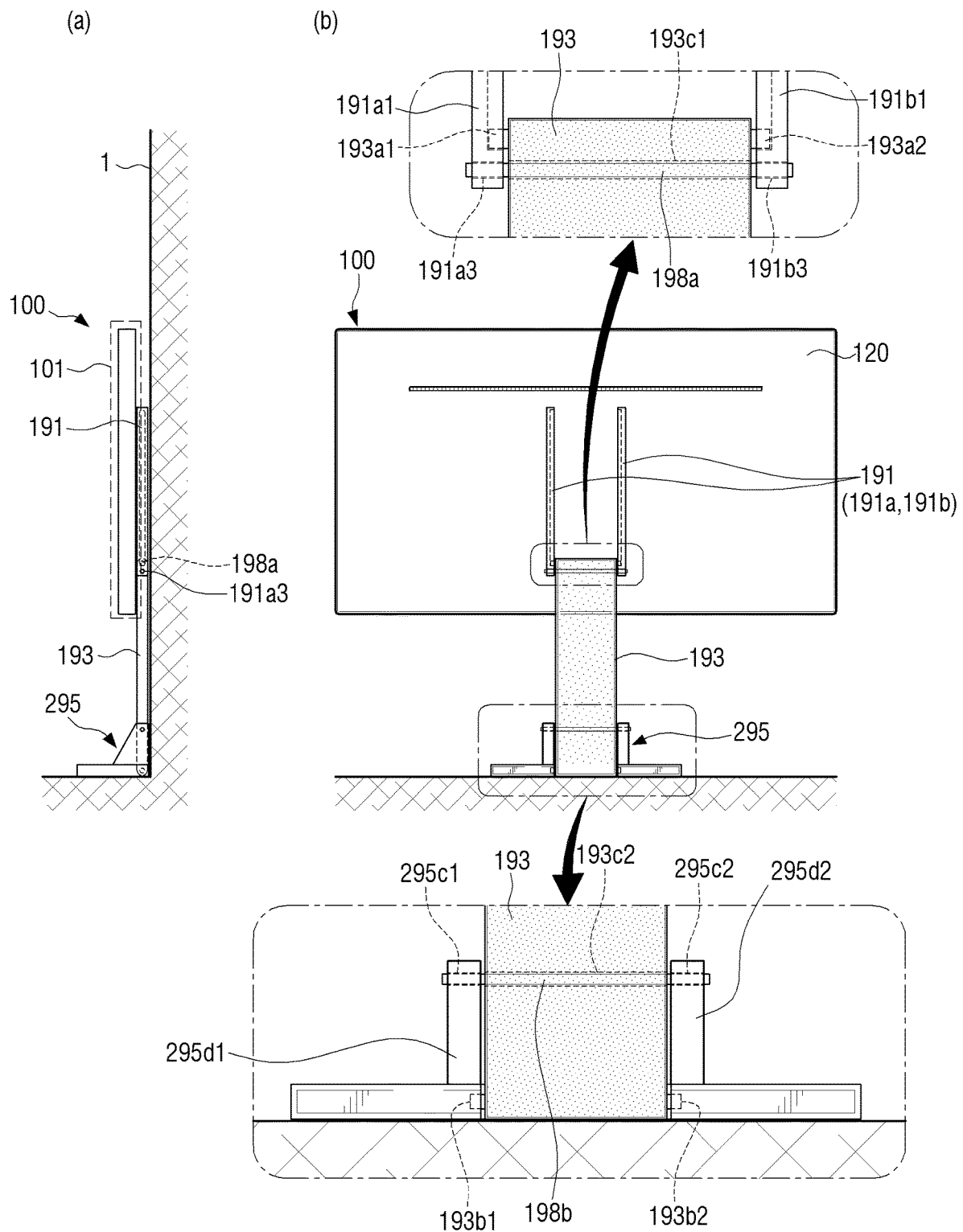

FIGS. 7A and 7B are a schematic side view and rear view showing a display apparatus in a first state and a second state according to another embodiment of the present disclosure.

Referring to FIGS. 7A and 7B, the display apparatus 100 may include the convertible stand 190 for supporting the display unit 101 in one of the first state and the second state. A state (e.g., a first state and a second state) of the convertible stand 190 of FIGS. 7A and 7B may be substantially similar to a state (e.g., a first state and a second state) of the convertible stand 190 of FIGS. 1B and 2B and, thus, a repeated description thereof will be omitted therein.

The convertible stand 190 of FIGS. 7A and 7B is substantially similar (e.g., a difference of a pin 198 and a difference of the base 295) to the convertible stand 190 of FIGS. 1B and 2B and, thus, a repeated description thereof will be omitted therein. Pins 198a and 198b of FIGS. 7A and 7B may be plural different from the pin 198 of FIGS. 6A and 6B.

The pin 198a as one of a plurality of pins may fix the support 193 to the rail brackets 191a and 191b. The pin 198a may fix rotation and sliding (or moving) of the support 193 with respect to the rail brackets 191a and 191b. The other pin 198*b* may fix the support 193 to the base 295. The pin 198*b* may fix rotation of the support 193 with respect to the base 295. The pins 198*a* and 198*b* may include a fixing pin.

The convertible stand 190 except for the pins 198*a* and 198*b* in FIGS. 7A and 7B may be similar to a function and operation of the convertible stand 190 of FIGS. 1B and 2B.

A hole 193*c*1 corresponding to the pin 198*a* may be formed at the upper end of the support 193. The holes 191*a*2 and 191*b*2 corresponding to the pin 198*a* may be formed in the rail brackets 191*a* and 191*b* of the convertible stand 190 corresponding to the first state, respectively. The holes 191*a*2 and 191*b*2 corresponding to the pin 198*a* may be formed at the upper end of the rail brackets 191*a* and 191*b* corresponding to the first state. The holes 191*a*2 and 191*b*2 may be formed in the rail brackets 191*a* and 191*b*, respectively, to be adjacent (e.g., 4 cm or less) to the upper protrusions 193*a*1 and 193*a*2 of the support 193.

In the first state, the pin 198*a* may be inserted into the hole 193*c*1 of the support 193 and the holes 191*a*2 and 191*b*2 of the rail brackets 191*a* and 191*b*. In the first state, the pin 198*a* may be inserted into only one of the hole 191*a*2 and the hole 191*b*2 according to an insertion direction of a pin.

An additional hole (e.g., one or two or more) may be formed at the upper end of the rail brackets 191*a* and 191*b* in the first state to be adjacent (e.g., 4 cm or less) to the holes 191*a*2 and 191*b*2 corresponding to the pin 198*a*. In addition, an additional hole (e.g., one or two or more) corresponding to an angle α between the support 193 and the rail brackets 191*a* and 191*b* may be formed at the upper end of the rail brackets 191*a* and 191*b* in the first state to be adjacent (e.g., 4 cm or less) to the holes 191*a*2 and 191*b*2 corresponding to the pin 198*a*.

The base 295 may have a structure corresponding to the pin 198*b*, differently from FIGS. 6A and 6B. The base 295 may include holes 295*c*1 and 295*c*2 corresponding to the pin 198*b* and side surfaces 295*d*1 and 295*d*2 with the holes 295*c*1 and 295*c*2 formed therein. In the first state, the pin 198*b* may not be inserted into the holes 295*c*1 and 295*c*2 of the base 295.

In FIG. 7B, the holes 191*a*3 and 191*b*3 corresponding to the pin 198*b* may be formed at the lower end of the rail brackets 191*a* and 191*b* of the convertible stand 190 corresponding to the second state.

An additional hole (e.g., one or two or more) may be formed at the lower end of the rail brackets 191*a* and 191*b* in the second state to be adjacent (e.g., 4 cm or less) to the holes 191*a*3 and 191*b*3 corresponding to the pin 198*a*. An additional hole (e.g., one or two or more) corresponding to an angle α between the support 193 and the rail brackets 191*a* and 191*b* may be formed at the lower end of the rail brackets 191*a* and 191*b* in the second state to be adjacent (e.g., 4 cm or less) to the holes 191*a*3 and 191*b*3 corresponding to the pin 198*a*.

In the second state, the pin 198*a* may be inserted into the hole 193*c*1 of the support 193 and the holes 191*a*3 and 191*b*3 of the rail brackets 191*a* and 191*b*. In addition, in the second state, the pin 198*a* may be inserted into only one of the hole 191*a*3 and the hole 191*b*3 according to an insertion direction of a pin.

In the second state, the pin 198*b* may be inserted into a hole 193*c*2 of the support 193 and the holes 295*c*1 and 295*c*2 of the base 295. In addition, in the second state, the pin 198*b* may be inserted into only one of a hole 295*c*1 and a hole 295*c*2 according to an insertion direction of a pin.

The number of holes formed in the support 193 may be plural. The number of holes of the support 193 may be smaller than the number of holes of the rail bracket 191. The number of holes of the support 193 may be equal to or less than the number of holes of the rail bracket 191*a*. In addition, the number of holes of the support 193 may be equal to or less than the number of holes of the rail bracket 191*b*.

FIG. 8 is a schematic side view and rear view showing a display apparatus in a first state according to another embodiment of the present disclosure.

FIG. 8 shows the display apparatus 100 including the convertible stand 190 in the first state. In the first state, the display unit 101 may contact a surface of the furniture 5. A pad 101*a* formed of a material that absorbs impact due to contact of the display unit 101 with the furniture 5 may be coupled to a bottom surface of the display unit 101 via a coupling member (e.g., screw, rivet, or adhesive). The pad 101*a* may prevent slip of the display unit 101.

The number of pads 101*a* may be one or plural. The number of the pads 101*a* may be changed depending on at least one of a horizontal length (e.g., corresponding to an x direction) and weight of the display unit 101. A thickness (e.g., an interval between the display unit 101 and the surface of the furniture 5) of the pad 101*a* may be 2 cm or less. When the number of the pads 101*a* is plural, an interval between the plurality of pads 101*a* that face each other may be less than a horizontal length of the display unit 101.

The pad 101*a* of FIG. 8 may be embodied with the display unit 101 of FIG. 1B, the display unit 101 of FIG. 4A, the display unit 101 of FIG. 5A, the display unit 101 of FIG. 6A, and/or the display unit 101 of FIG. 7A.

Figure 9A:
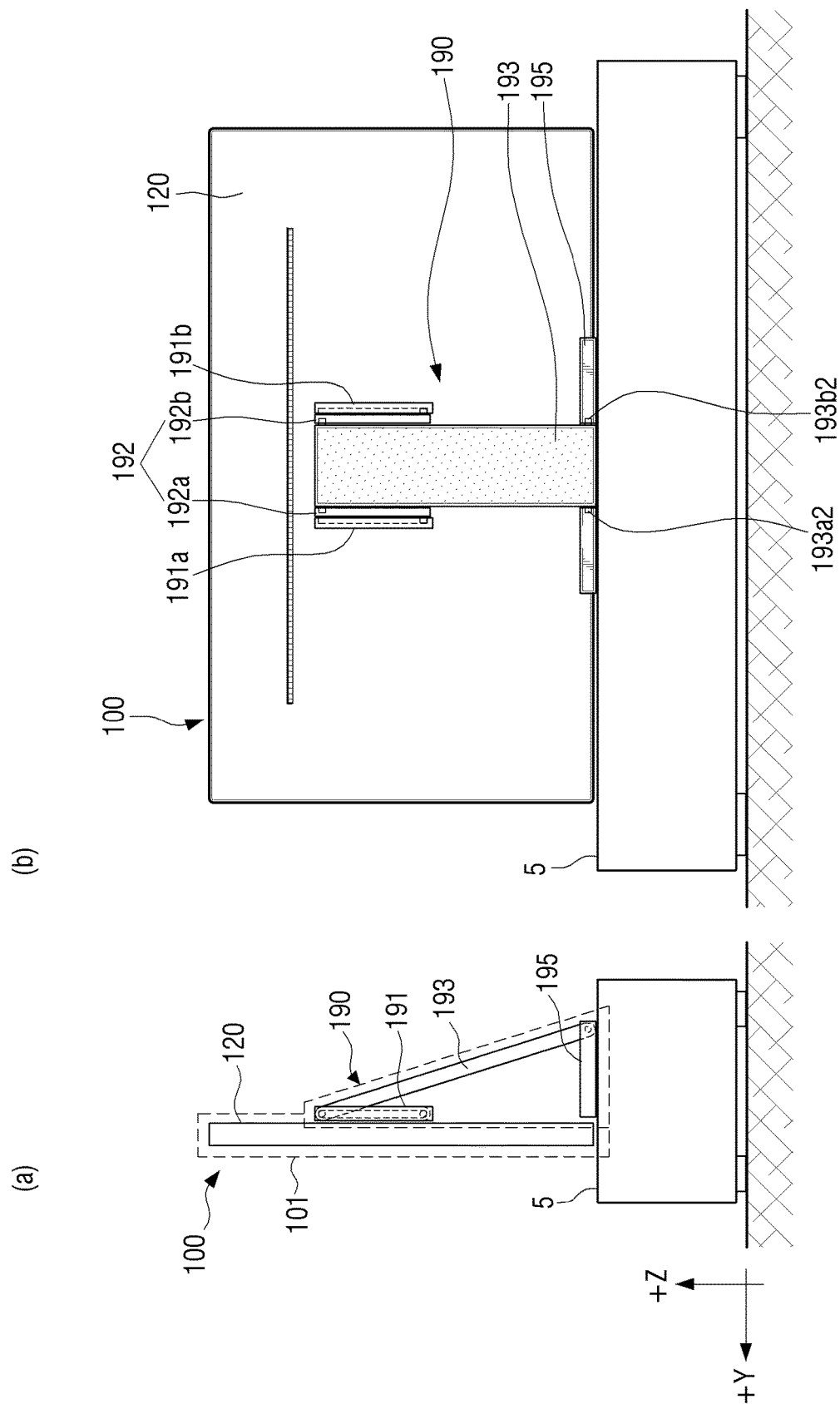

FIGS. 9A and 9B are a schematic side view and rear view showing a display apparatus in a first state and a second view according to another embodiment of the present disclosure.

FIGS. 9A and 9B show the display apparatus 100 including the convertible stand 190 in the first state. The convertible stand 190 of FIGS. 9A and 9B is substantially similar (e.g., a difference of a support) to the convertible stand 190 of FIGS. 1B and 2B and, thus, a repeated description thereof will be omitted therein.

A vertical length (e.g., a first direction) of the rail bracket 191 coupled to the rear cover 120 may be less than a vertical length of the rail bracket 191 of FIGS. 1B and 2B.

In FIGS. 9A and 9B, the support 193 may include a plurality of links 192 and 193, differently from one link 193 embodied in FIGS. 1B and 2B. One link 192 (192*a* or 192*b*) may be coupled to the rail bracket 191. Links 192*a* and 192*b* may be coupled to the rail brackets 191*a* and 191*b*, respectively. Upper protrusions 192*a*1 and 192*b*1 of the links 192*a* and 192*b* may be coupled to the rail brackets 191*a* and 191*b*, respectively. The protrusions 192*a*1 and 192*b*1 of the links 192*a* and 192*b* may rotate and/or slide with respect to the rail brackets 191*a* and 191*b*.

A lower end of the links 192*a* and 192*b* and upper protrusions 193*a*1 and 193*b*1 of the support 193 (or another link) may be coupled via a joint. The lower end of the links 192*a* and 192*b* and upper protrusions 193*a*1 and 193*b*1 of the support 193 (or another link) may be rotated at a predetermined set (e.g., 180° or less). The lower protrusions 193*a*2 and 193*b*2 of the support 193 (or another link) may be coupled to the base 195.

In FIGS. 9A and 9B, an entire vertical length of the rail brackets 191*a* and 191*b* may be reduced due to the supports 192 and 193 embodied as a plurality of links.

The foregoing embodiments and advantages are merely exemplary and are not to be construed as limiting the present disclosure. The present teaching can be readily applied to other types of apparatuses. Also, the description of the embodiments of the present disclosure is intended to be illustrative, and not to limit the scope of the claims, and many alternatives, modifications, and variations will be apparent to those skilled in the art.

What is claimed is:

1. A display apparatus comprising:
a display body; and
a convertible stand coupled to a rear cover of the display body and configured to support the display body in a first state and a second state, the first state being a standing state and the second state being a wall-mounted state,
wherein a portion of the convertible stand has light transmittance higher than or equal to 80%,
wherein the convertible stand comprises:
a rail bracket coupled to the rear cover;
a support coupled to the rail bracket; and
a base coupled to the support,
wherein the support includes a first link coupled to the rail bracket and a second link coupled to the base,
wherein the first link includes an upper end hinged to the rail bracket and a lower end, and the second link includes an upper end coupled to the lower end of the first link and a lower end coupled to the base,
wherein in the first state, the first link and the second link of the support are folded such that the first link is parallel to the rail bracket, the lower end of the first link is positioned higher than the upper end of the first link on the rear cover, a first acute angle is formed between the first link and the second link, the first acute angle is formed between the second link of the support and the rail bracket, and a second acute angle is formed between the second link of the support and the base, and
wherein in the second state, the first link and the second link of the support are unfolded such that the first link and the second link of the support are parallel to the rail bracket, the upper end of the first link is positioned higher than the lower end of the first link on the rear cover, and a right angle is formed between the second link of the support and the base.

2. The display apparatus as claimed in claim 1, wherein the support comprises upper protrusions positioned on upper side surfaces of the support; and
wherein the rail bracket comprises guide rails formed on side surfaces of the rail bracket corresponding to the upper protrusions.

3. The display apparatus as claimed in claim 2, wherein the upper protrusions are configured to perform at least one of sliding and rotation with respect to the guide rails of the rail bracket.

4. The display apparatus as claimed in claim 1, wherein the rail bracket includes guide rails positioned at opposite sides with respect to the support.

5. The display apparatus as claimed in claim 2, wherein the number of upper protrusions of the support is the same as the number of the rail brackets.

6. The display apparatus as claimed in claim 1, wherein the rail brackets are fixed to at least one of video electronics standards association (VESA) holes formed in the rear cover.

7. The display apparatus as claimed in claim 1, wherein the support comprises lower protrusions positioned on lower side surfaces of the support; and
wherein the base comprises openings formed in side surfaces of the base corresponding to the lower protrusions.

8. The display apparatus as claimed in claim 7, wherein the lower protrusions are rotatable with respect to the base.

9. The display apparatus as claimed in claim 1, wherein light transmittance of the support is higher than or equal to 80%.

10. The display apparatus as claimed in claim 1, wherein the support is divided into a first support and a second support depending on light transmittance; and
wherein the first support in the first state is hidden by the display body when viewed from in front of the display body.

11. The display apparatus as claimed in claim 1, wherein the support comprises a plurality of electrodes configured to supply power to the display body; and
wherein one of the plurality of electrodes comprises ground.

12. The display apparatus as claimed in claim 11, wherein light transmittance of the support and light transmittance of the plurality of electrodes are the same.

13. The display apparatus as claimed in claim 1, wherein, in the first state, an upper end of the rail bracket is coupled to the upper end of the second link.

14. The display apparatus as claimed in claim 1, wherein, in the second state, the rail bracket and the support are fixed by one pin inserted into a lower end of the rail bracket and the upper end of the first link.

15. The display apparatus as claimed in claim 1, wherein in the first state, the first link and the rail bracket are folded such that the lower end of the first link is disposed at an upper end of the rail bracket, and
wherein in the second state, the first link and the rail bracket are unfolded such that the rail bracket, the first link and the second link are parallel with each other.

16. The display apparatus as claimed in claim 1, wherein a portion of the convertible stand contacts a wall facing the rear cover in the second state.

17. The display apparatus as claimed in claim 1, wherein the display body comprises at least one pads configured to contact a surface of furniture in the first state.

18. A display apparatus comprising:
a display body; and
a convertible stand comprising a rail bracket coupled to a rear cover of the display body, a support coupled to the rail bracket, and a base coupled to the support, the convertible stand being configured to support the display body in one of a standing state and a wall-mounted state,
wherein opposite ends of the support are hinged to the rail bracket and the base, respectively,
wherein the support includes a first link and a second link,
wherein the first link includes an upper end hinged to the rail bracket and a lower end, and the second link includes an upper end coupled to the lower end of the first link and a lower end coupled to the base, and
wherein in the standing state, the first link and the second link of the support are folded such that the first link is parallel to the rail bracket, the lower end of the first link is positioned higher than the upper end of the first link on the rear cover, a first acute angle is formed between the first link and the second link, the first acute angle is formed between the second link of the support and the rail bracket, and a second acute angle is formed between the second link of the support and the base, and
wherein in the wall-mounted state, the first link and the second link of the support are unfolded such that the first link and the second link of the support are parallel to the rail bracket, the upper end of the first link is positioned higher than the lower end of the first link on the rear cover, and a right angle is formed between the second link of the support and the base.

* * * * *